US010193678B2

(12) United States Patent
Bhattad et al.

(10) Patent No.: US 10,193,678 B2
(45) Date of Patent: Jan. 29, 2019

(54) MUTING SCHEMES FOR CHANNEL STATE INFORMATION REFERENCE SIGNAL AND SIGNALING THEREOF

(75) Inventors: Kapil Bhattad, San Diego, CA (US); Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1154 days.

(21) Appl. No.: 13/077,835

(22) Filed: Mar. 31, 2011

(65) Prior Publication Data

US 2012/0076106 A1    Mar. 29, 2012

Related U.S. Application Data

(63) Continuation-in-part of application No. 12/899,448, filed on Oct. 6, 2010.

(60) Provisional application No. 61/321,473, filed on Apr. 6, 2010, provisional application No. 61/249,906, filed on Oct. 8, 2009, provisional application No. 61/257,187, filed on Nov. 2, 2009.

(51) Int. Cl.
*H04L 5/00* (2006.01)

(52) U.S. Cl.
CPC ............ *H04L 5/005* (2013.01); *H04L 5/0035* (2013.01); *H04L 5/0062* (2013.01); *H04L 5/0064* (2013.01); *H04L 5/0073* (2013.01); *H04L 5/0091* (2013.01)

(58) Field of Classification Search
CPC ... H04L 5/0073; H04L 5/0091; H04L 5/0016; H04L 5/0064; H04L 5/0035; H04L 5/0007; H04L 5/005; H04L 5/0048; H04L 1/0068; H04L 1/0069; H04W 36/30; H04W 24/02; H04W 52/241; H04W 72/08

See application file for complete search history.

(56) References Cited

U.S. PATENT DOCUMENTS

| 7,573,854 | B2* | 8/2009 | Heo et al. ............. 370/335 |
| 8,000,284 | B2 | 8/2011 | Lott et al. |
| 8,310,994 | B2 | 11/2012 | Kwon et al. |

(Continued)

FOREIGN PATENT DOCUMENTS

| CN | 1270552 A | 10/2000 |
| CN | 101478365 A | 7/2009 |

(Continued)

OTHER PUBLICATIONS

Alcatel-Lucent Shanghai Bell: "Considerations on CSI-RS design", 3GPP TSG-RAN WG1#58b R1-093772, Oct. 6, 2009.

(Continued)

*Primary Examiner* — Hassan Kizou
*Assistant Examiner* — Roberta A Shand
(74) *Attorney, Agent, or Firm* — Liem T. Do

(57) ABSTRACT

A method of wireless communication is provided which includes establishing a time-frequency muting pattern including at least one data resource element (RE) and transmitting information indicating the time-frequency muting pattern to a user equipment. In some designs, the muting pattern is established by grouping a plurality of resource elements into muting groups such that the time-frequency muting pattern includes the muting groups.

95 Claims, 20 Drawing Sheets

(56) References Cited

U.S. PATENT DOCUMENTS

| | | | |
|---|---|---|---|
| 8,559,879 | B2 | 10/2013 | Bhushan et al. |
| 8,913,581 | B2* | 12/2014 | Noh et al. ............ 370/329 |
| 2006/0153312 | A1 | 7/2006 | Yun et al. |
| 2008/0225784 | A1 | 9/2008 | Tseng |
| 2009/0202014 | A1* | 8/2009 | Mujtaba et al. ............ 375/267 |
| 2009/0225721 | A1 | 9/2009 | Cudak et al. |
| 2009/0296563 | A1 | 12/2009 | Kishiyama et al. |
| 2010/0034299 | A1* | 2/2010 | Love et al. ............ 375/260 |
| 2010/0075691 | A1 | 3/2010 | Cai et al. |
| 2010/0080187 | A1 | 4/2010 | Papasakellariou et al. |
| 2010/0238821 | A1* | 9/2010 | Liu et al. ............ 370/252 |
| 2010/0265901 | A1 | 10/2010 | Koo et al. |
| 2011/0176499 | A1* | 7/2011 | Siomina ............ G01S 1/042 370/329 |
| 2011/0200126 | A1 | 8/2011 | Bontu et al. |
| 2011/0237270 | A1 | 9/2011 | Noh et al. |
| 2011/0244877 | A1 | 10/2011 | Farajidana et al. |
| 2011/0252139 | A1* | 10/2011 | Bhattad et al. ............ 709/226 |
| 2011/0274071 | A1 | 11/2011 | Lee et al. |
| 2011/0317641 | A1 | 12/2011 | Noh et al. |
| 2012/0002740 | A1 | 1/2012 | Han et al. |
| 2012/0039298 | A1 | 2/2012 | Lee, II et al. |
| 2012/0058791 | A1 | 3/2012 | Bhattad et al. |
| 2012/0076106 | A1* | 3/2012 | Bhattad ............ H04L 5/0035 370/330 |
| 2012/0082119 | A1 | 4/2012 | Chung et al. |
| 2012/0092989 | A1 | 4/2012 | Baldemair et al. |
| 2012/0106493 | A1 | 5/2012 | Noh et al. |
| 2012/0120842 | A1* | 5/2012 | Kim et al. ............ 370/252 |
| 2012/0120903 | A1 | 5/2012 | Kim et al. |
| 2012/0120905 | A1 | 5/2012 | Ko et al. |
| 2012/0127945 | A1 | 5/2012 | Ko et al. |
| 2012/0147794 | A1 | 6/2012 | Chung et al. |
| 2012/0155414 | A1* | 6/2012 | Noh et al. ............ 370/329 |
| 2012/0220327 | A1 | 8/2012 | Lee et al. |
| 2012/0257553 | A1 | 10/2012 | Noh et al. |
| 2012/0264441 | A1* | 10/2012 | Chandrasekhar et al. .... 455/450 |
| 2012/0315859 | A1* | 12/2012 | Lee ............ H04J 11/005 455/67.13 |
| 2013/0039203 | A1 | 2/2013 | Fong et al. |
| 2013/0039388 | A1 | 2/2013 | Xu et al. |

FOREIGN PATENT DOCUMENTS

| | | |
|---|---|---|
| CN | 101483499 A | 7/2009 |
| CN | 101505180 A | 8/2009 |
| CN | 101588631 A | 11/2009 |
| CN | 101636938 A | 1/2010 |
| EP | 2456154 A2 | 5/2012 |
| JP | 2011515047 A | 5/2011 |
| JP | 2012510772 A | 5/2012 |
| KR | 20070089107 A | 8/2007 |
| KR | 20080054164 A | 6/2008 |
| TW | 200526051 A | 8/2005 |
| TW | 200709596 | 3/2007 |
| WO | WO-2005018181 | 2/2005 |
| WO | WO-2006118434 A1 | 11/2006 |
| WO | WO-2007083081 A1 | 7/2007 |
| WO | WO-2008115003 A2 | 9/2008 |
| WO | WO-2009041770 A2 | 4/2009 |
| WO | WO-2009096319 A1 | 8/2009 |
| WO | WO-2009100371 A2 | 8/2009 |
| WO | WO-2009114376 A1 | 9/2009 |
| WO | WO-2009120791 A2 | 10/2009 |
| WO | WO-2009132143 A1 | 10/2009 |
| WO | WO-2010064842 A2 | 6/2010 |

OTHER PUBLICATIONS

Fujitsu: "Considerations on CSI RS design in LTE-A", 3GPP TSG-RAN WG1#58b R1-094249, Oct. 8, 2009.

Fujitsu: "CSI-RS and DRS Design for LTE-A System", 3GPP Draft; R1-091950, 3rd Generation Partnership Project (3GPP), Mobile Competence Centre; 650, Route Des Lucioles; F-06921 Sophia-Antipolis Cedex; France, no. San Francisco, USA; May 2, 2009, May 2, 2009 (May 2, 2009), XP050339424, [retrieved on May 2, 2009] p. 1-p. 2 figures 1, 3, 5-8.

NTT DOCOMO: "DL CSI-RS Design for LTE-Advanced", 3GPP TSG-RAN WG1#58b R1-094240, Oct. 6, 2009.

Panasonic: "Views on CSI-RS and Rel-8 CRS configuration", 3GPP TSG-RAN WG1#58 R1-093455, Aug. 18, 2009.

Samsung: "Discussions on CSI-RS for LTE-Advanced", 3GPP TSG-RAN WG1#57 R1-092204, May 5, 2009.

ZTE: "DL Reference Signal Design for CSI generation in LTE-Advanced", 3GPP TSG-RAN WG1#57 R1-091714, Apr. 28, 2009.

Alcatel-Lucent Shanghai Bell et al: CSI-RS Inter—cell Design Consideration, 3GPP Draft; R1-100924_Final, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010 (Feb. 16, 2010), XP050418523, [retrieved on Feb. 16, 2010].

CATT: "Intra cell and inter cell CSI RS design for LTE-A", 3GPP Draft; R1-100885, 3rd Generation Partnership Project (3GPP), Mobile Competence Centre ; 650, Route Des Lucioles ; F-06921 Sophia-Antipolis Cedex 71, ; France, vol. RAN WGI, no. San Francisco, USA; Feb. 22, 2010, Feb. 16, 2010 (Feb. 16, 2010), 92-107, XP050418489, [retrieved on Feb. 16, 2010].

Fujitsu: "Considerations on CSI RS design in LTE-A", 3GPP Draft, R1-094331, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 12, 2009 (Oct. 12, 2009), XP050388785, [retrieved on Oct. 15, 2009].

Huawei: "Inter-cell CSI-RS Analysis", 3GPP Draft, R1-100248 Inter-Cell CSI RS, 3rd Generation Partnership Project (3GPP), Mobile Competence Centre, 650, Route Des Lucioles, F-06921 Sophia-Antipolis Cedex, France, vol. RAN WGI, no. Valencia, Spain, Jan. 18, 2010, Jan. 14, 2009 (Jan. 14, 2009), XP050418351, [retrieved on Jan. 14, 2010].

Huawei: "Intra-cell CSI RS design and evaluation", 3GPP Draft; R1-100782, 3rd Generation Partnership Project (3GPP), Mobile Competence Centre ; 650, Route Des Lucioles ; F-06921 Sophia-Antipolis Cedex ; France, vol. RAN WGI, no. Valencia, Spain; Jan. 18, 2010, Jan. 21, 2010 (Jan. 21, 2010), XP050418401, [retrieved on Jan. 21, 2010].

Intel Corporation (UK) Ltd: "Signalling and power utilization considerations for PDSCH muting", 3GPP Draft; R1-104376, 3rd Generation Partnership Project (3GPP), Mobile Competence Centre ; 650, Route Des Lucioles ; F-06921 Sophia-Antipolis Cedex ; France, vol. RAN WGI, no. Madrid, Spain; Aug. 23, 2010, Aug. 17, 2010 (Aug. 17, 2010), XP050449727, [retrieved on Aug. 17, 2010].

Intel Corporation (UK): "Remaining details of CSI-RS structure", 3GPP Draft; R1-110249, 3rd Generation Partnership Project (3GPP), Mobile Competence Centre ; 650, Route Des Lucioles ; F-06921 Sophia-Antipolis Cedex ; France, vol. RAN WGI, no. Dublin, Ireland; Jan. 17, 2011, Jan. 11, 2011 (Jan. 11, 2011), XP050490153, [retrieved on Jan. 11, 2011].

International Search Report and Written Opinion—PCT/US2011/031456, ISA/EPO—Sep. 28, 2011.

Motorola: "Impact of Supporting Blank Sub frames", 3GPP TSG RAN Plenary Meeting No. 42, Athens, Greece, [Online] vol. RP-081059, Dec. 2, 2008 (Dec. 2, 2008), pp. 1-10, XP002589696, Retrieved from the Internet: URL:http://www.3gpp.org/ftp/tsg-ran/tsg-ran/TSGR42/docs/> [retrieved on Jun. 28, 2010] the whole document.

Nokia et al., "CSI-RS design for LTE-Advanced downlink", 3GPP Draft, R1-091351, 3rd Generation Partnership Project (3GPP), Mobile Competence Centre, 650, Route Des Lucioles, F-06921 Sophia-Antipolis Cedex, France, no. Seoul, Korea, Mar. 18, 2009, Mar. 18, 2009 (Mar. 18, 2009), XP050338944, [retrieved on Mar. 18, 2009].

Nokia, et al., "Further considerations on UE-specific reference symbol multiplexing for LTE-Advanced downlink", 3GPP Draft, R1-091757, 3rd Generation Partnership Project (3GPP), Mobile Competence Centre, 650, Route Des Lucioles, F-06921 Sophia-

(56) References Cited

OTHER PUBLICATIONS

Antipolis Cedex, France, no. San Francisco, USA, Apr. 28, 2009, Apr. 28, 2009 (Apr. 28, 2009), XP050339282, [retrieved on Apr. 28, 2009].
Nokia et al: "Transmit Diversity in CSI-RS Subframes", 3GPP Draft; R1-106202, 3rd Generation Partnership Project (3GPP), Mobile Competence Centre ; 650, Route Des Lucioles ; F-06921 Sophia-Antipolis Cedex ; France, vol. RAN WGI, no. Jacksonville, USA; Nov. 15, 2010, Nov. 9, 2010 (Nov. 9, 2010), XP050466933, [retrieved on Nov. 9, 2010].
NTT DOCOMO: "Csi-Rs Design for LTE-Advanced", 3GPP Draft; R1-101214 CSI-RS Design, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010 (Feb. 16, 2010), XP050418731, [retrieved on Feb. 16, 2010].
Panasonic: "Downlink CSI-RS design for inter-cell scenarios", 3GPP Draft, R1-093457, 3rd Generation Partnership Project (3GPP), Mobile Competence Centre, 650, Route Des Lucioles, F-06921 Sophia-Antipolis Cedex, France, no. Shenzhen, China, Aug. 18, 2009, Aug. 18, 2009 (Aug. 18, 2009), XP050351727, [retrieved on Aug. 18, 2009].
Qualcomm Inc: "SFBC PDSCH transmission in CSI-RS subframes", 3GPP Draft; R1-104798 SFBC Mapping, 3rd Generation Partnership Project (3GPP), Mobile Competence Centre ; 650, Route Des Lucioles ; F-06921 Sophia-Antipolis Cedex ; France, vol. RAN WGI, no. Madrid, Spain; Aug. 23, 2010, Aug. 17, 2010 (Aug. 17, 2010), XP050449990, [retrieved on Aug. 17, 2010].
Qualcomm Incorporated: "Finalizing Signaling and Configuration of CSI-RS", 3GPP Draft; R1-105565 Finalizing Signaling and Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, no. Xian; Oct. 11, 2010, Oct. 5, 2010 (Oct. 5, 2010), XP050450663, [retrieved on Oct. 5, 2010].
Samsung, "Discussions on CSI-RS for LTE-Advanced", 3GPP Draft, R1-093375 CSI RS Designs in LTE-A, 3rd Generation Partnership Project (3GPP), Mobile Competence Centre , 650, Route Des Lucioles , F-06921 Sophia-Antipolis Cedex , France, no. Shenzhen, China, Aug. 19, 2009, Aug. 19, 2009 (Aug. 19, 2009), XP050351673.
Samsung: "Necessity of Orthogonal Inter—cell CSI-RS Patterns", 3GPP Draft; R1-101156 Orthogonal CSI-RS Pattern, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010 (Feb. 16, 2010), XP050418696, [retrieved on Feb. 16, 2010].
Samsung, "Performance evaluation for CSI-RS design", 3GPP TSG RAN WG1 #59bis, R1-100106, Valencia, Spain, Jan. 18-22, 2009.
Texas Instruments: "Multiplexing and Signaling Support for Downlink COMP", 3GPP Draft, R1-091292 TI DL Comp, 3rd Generation Partnership Project (3GPP), Mobile Competence Centre, 650, Route Des Lucioles, F-06921 Sophia-Antipolis Cedex, France, no. Seoul, Korea, Mar. 18, 2009, Mar. 18, 2009 (Mar. 18, 2009), XP050338899, [retrieved on Mar. 18, 2009].
ZTE, "Resource Mapping Issues on JP transmission in CoMP", 3GPP Draft, R1-090070 Resource Mapping Issues on JP Transmission in Comp, 3rd Generation Partnership Project (3GPP), Mobile Competence Centre , 650, Route Des Lucioles , F-06921 Sophia-Antipolis Cedex , France, no. Ljubljana, Jan. 7, 2009, Jan. 7, 2009 (Jan. 7, 2009), XP050318014.
"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0 (Dec. 2009).
"Way forward on CoMP and MIMO DL RS—Outcome of ad hoc discussions" Tdoc R1-090529, 3GPP TSG-RAN-WG1 #55 bis, Jan. 12-16, 2009, Ljubljana, Slovenia.

Qualcomm Europe, "Further Considerations and Link Simulations on Reference Signals in LTE-A", 3GPP TSG-RAN WG1 #56, R1-090875, Feb. 9-13, 2009, Athens, Greece.
Qualcomm Europe, "Downlink RS structure in support of higher-order MIMO", 3GPP TSG-RAN WG1 #57, R1-092050, May 4-8, 2009, San Francisco, USA.
Nokia, Nokia Siemens Networks, "On the impact of CSI-RS puncturing to Rel'8 PDSCH performance", 3GPP TSG RAN WG1 Meeting #57bis, R1-092557, Los Angeles, USA, Jun. 29-Jul. 3, 2009.
Samsung, "Discussions on CSI-RS for LTE-Advanced", 3GPP TSG RAN WG1 #57bis, R1-092651, Los Angeles, USA, Jun. 29-Jul. 3, 2009.
Alcatel-Lucent, et al. "Proposed Way forward on Rel-9 Dual-layer beamforming for TDD and FDD", 3GPP TSG RAN WG1 meeting #58, R1-093697, CHN, Shenzhen, Aug. 24-28, 2009.
Qualcomm Europe, "UE-RS Patterns for Rank 3-4", 3GPP TSG-RAN WG1 #58bis R1-094211, Oct. 12-16, 2009, Miyazaki, Japan.
Qualcomm Europe, "UE-RS Patterns for ranks 5 to 8 of LTE-A" 3GPP TSG-RAN WG1 #58bis R1-094212, Oct. 12-16, 2009 Miyazaki, Japan.
LG Electronics, et al., "Harmonized Proposal for CSI-RS Pattern", 3GPP TSG RAN WG1 Meeting #61b, R1-104263, Dresden, Germany, Jun. 28-Jul. 2, 2010.
Huawei, "Evaluation on muting benefit for CSI RS design", 3GPP TSG-RAN WG1 #61, R1-103102, Montreal, Canada, May 10-14, 2010.
NTT DOCOMO, "Performance Evaluation of RE Muting for Inter-cell CSI-RS" 3GPP TSG RAN WG1 Meeting #61, R1-103254, Montreal, Canada, May 10-14, 2010.
Qualcomm Inc., "Benefits of Muting for Enhanced CSI Estimation" 3GPP TSG-RAN WG1 #60bis, R1-102332, Apr. 12-16, 2010, Beijing, China.
Texas Instruments, "PDSCH Muting for Inter-cell CSI estimation: Rel-8 UE Performance", 3GPP TSG RAN WG1 #61, R1-102819, Montreal, Canada, May 10-14, 2010.
Panasonic, "Link level analysis on RE muting for CSI-RS design: Step1 evaluation", 3GPP TSG RAN WG1 Meeting #61, R1-102871, Montreal, Canada, May 10-14, 2010.
ZTE, "CSI-RS Muting Evaluation", 3GPP TSG RAN WG1 Meeting #61, R1-102900, Montreal, Canada, May 10-14, 2010.
Nokia, Nokia Siemens Networks, "Stage 1 simulation study of RE muting for inter-cell CSI-RS", 3GPP TSG-RAN WG1 Meeting #61, R1-102957, Montreal, Canada, May 10-14, 2010.
LG Electronics, "Inter-Cell CSI-RS design and Inter-Cell measurement consideration", 3GPP TSG-RAN WG1 Meeting #60 R1-101550, Feb. 19, 2010, <http://www.3gpp.org/ftp/tsg_ran/wg1_rl1/TSGR1_60/Docs/>.
QUALCOMM Inc, "Further details on CSI-RS. [online]", 3GPP TSG-RAN WG1 #59bis R1-100681, Jan. 12, 2010, <http://www.3gpp.org/ftp/tsg_ran/wg1_rl1/TSGR1_59b/Docs/>.
ZTE Corporation, "CSI-RS Pattern Design for LTE-Advanced", 3GPP TSG-RAN WG1 Meeting #60 R1-100969, Feb. 18, 2010, <http://www.3gpp.org/ftp/tsg_ran/wg1_rl1/TSGR1_60/Docs/>.
Huawei: "Cell-specific mapping of distributed virtual resource blocks", 3GPP TSG-RAN WG1 Meeting #50, R1-073513, Aug. 20, 2007, pp. 1-8.
Huawei: "Further results of transmit diversity schemes for common", distributed and broadcast channels, 3GPP TSG-RAN WG1 Meeting #44, R1-060494, Feb. 13, 2006, pp. 1-6.
Baker M., "LTE-Advanced Physical Layer", IMT-Advanced Evaluation Workshop Dec. 17-18, 2009, Beijing, 9 No. Rev-090003r1 Dec. 17, 2009 (Dec. 17, 2009), pp. 1-48, XP002637658, Retrieved from the Internet: URL:http://www.3gpp.org/ftp/workshop/2009-12-17_ITU-R_IMT-Adv_eval/docs/pdf/REV-090003-r1.pdf [retrieved on May 18, 2011] p. 17-p. 19.
Huawei Technologies., "CSI-RS simulation assumptions", 3GPP TSG RAN WG1 meeting #60, R1-101632, Feb. 22-26, 2010, San Francisco, USA, 7 pages.
Qualcomm Inc., "Further Details on CSI-RS", 3GPP TSG-RAN WG1 #60, R1-101485, 7.2.2, Feb. 22-26, 2010, San Francisco, USA, 4 Pages.
Taiwan Search Report—TW104114075—TIPO—May 6, 2016.

(56) References Cited

OTHER PUBLICATIONS

Taiwan Search Report—TW104114073—TIPO—Mar. 29, 2016.
Taiwan Search Report—TW104114074—TIPO—Mar. 31, 2016.
Taiwan Search Report—TW100111873—TIPO—Oct. 29, 2014.
Qualcomm Europe: "Details of CSI-RS", 3GPP Draft; R1-094214 CSI-RS Details, 3rd Generation Partnership Project (3GPP), Mobile Competence Centre; 650, Route Des Lucioles ; F-06921 Sophia-Antipolis Cedex ; France, Vol. RAN, WG1, No. Miyazaki; 20091012-20091016, Oct. 9, 2009 (Oct. 9, 2009), XP050597789, [retrieved on Oct. 9, 2009].
Taiwan Search Report—TW104114076—TIPO—dated Jun. 8, 2016.
Huawei: "Consideration on CSI-RS design for CoMP and text proposal to 36.814", 3GPP Draft; R1-093031 Consideration on CSI-RS Design for Comp and Text Proposal to 36.814, 3RD Generation Partnership Project (3GPP), Mobile Competence Centre ; 650, Route Des Lucioles ; F-06921 Sophia-Antipolis Cedex ; France, no. Shenzhen, China; Aug. 18, 2009, Aug. 18, 2009 (Aug. 18, 2009), XP050351428, [retrieved on Aug. 18, 2009].
LG Electronics: "Further Details on CSI-RS Design for LTE-Advanced", 3GPP TSG RAN WG1 Meeting #58bis, R1-094171, Oct. 6, 2009, 5 pages, URL:http://www.3gpp.org/ftp/tsg_ran/WG1_RL1/TSGR1_58b/Docs/R1-094171.zip.

\* cited by examiner

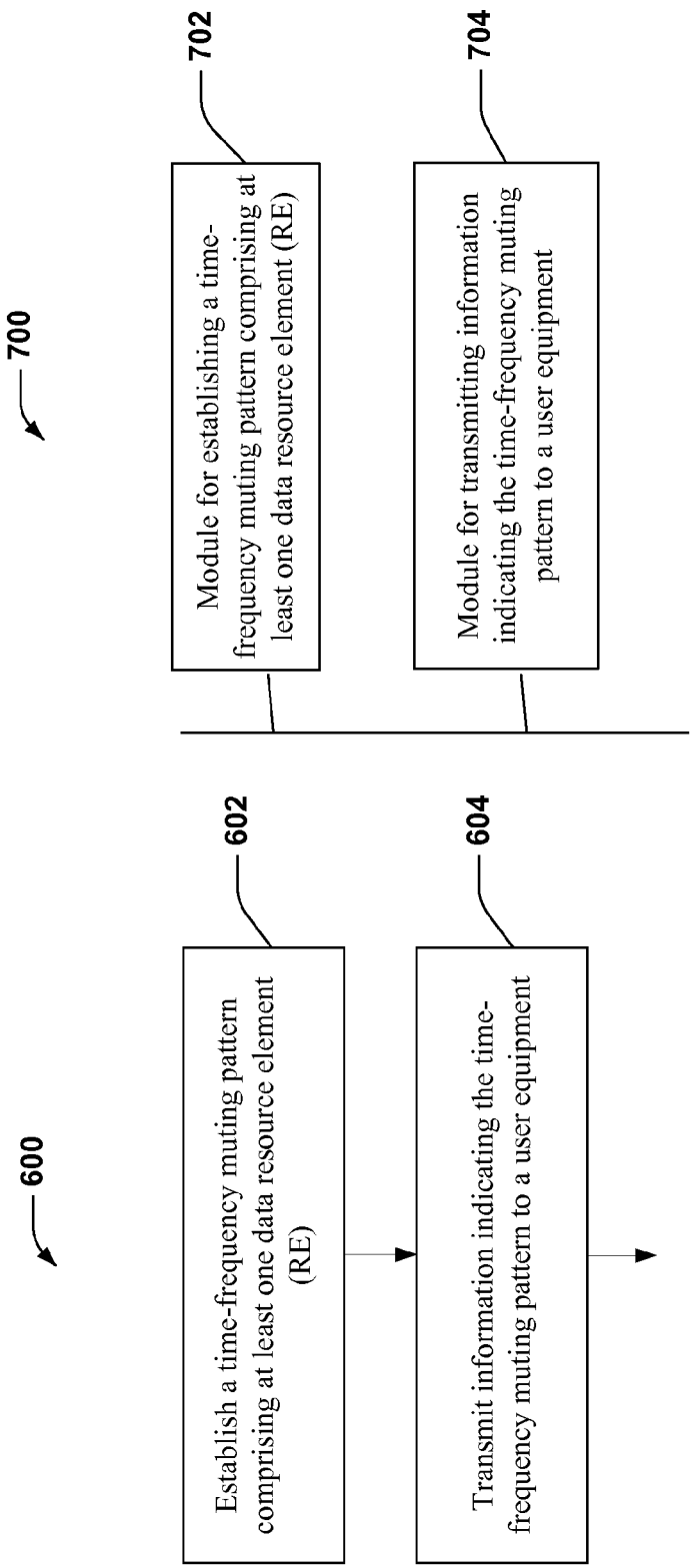

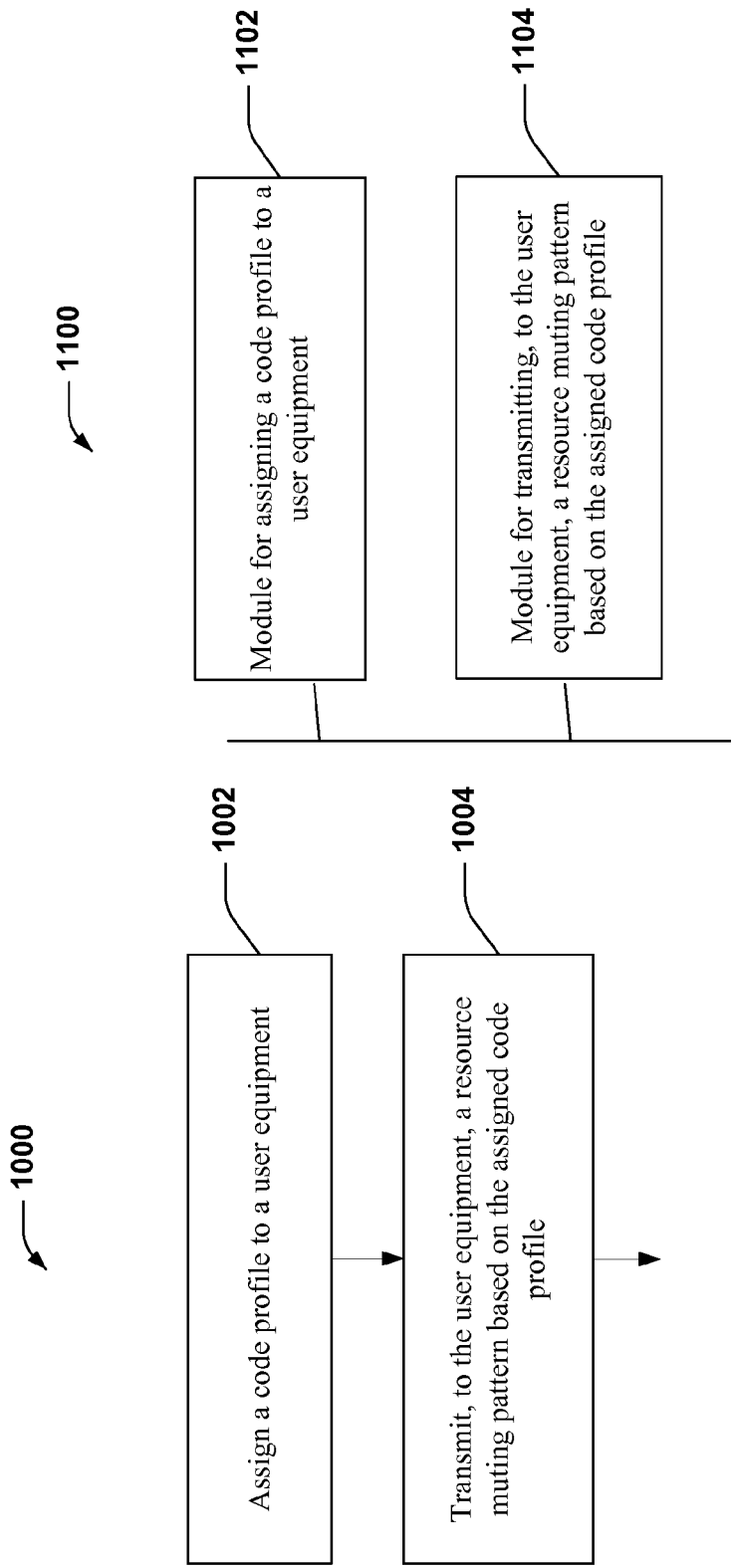

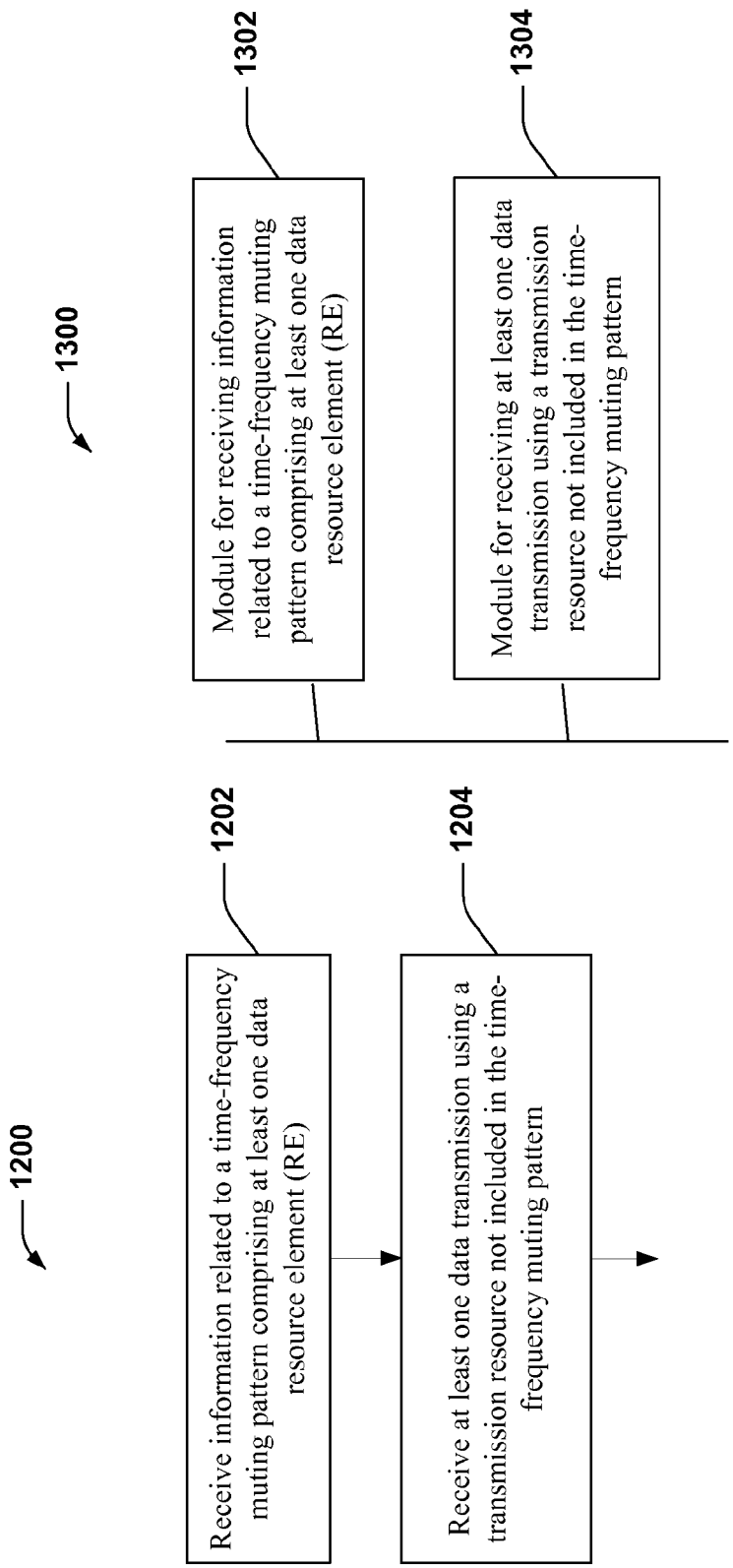

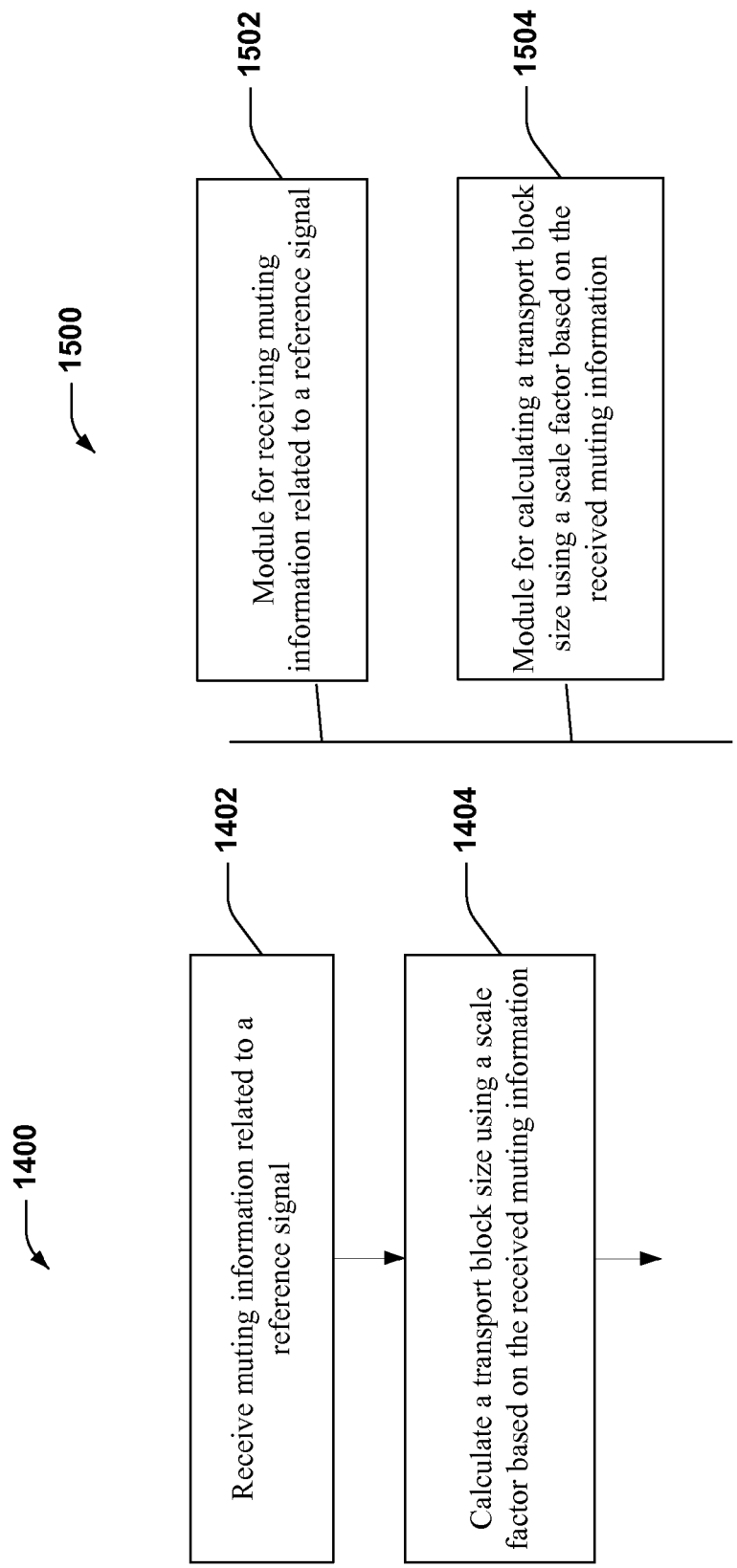

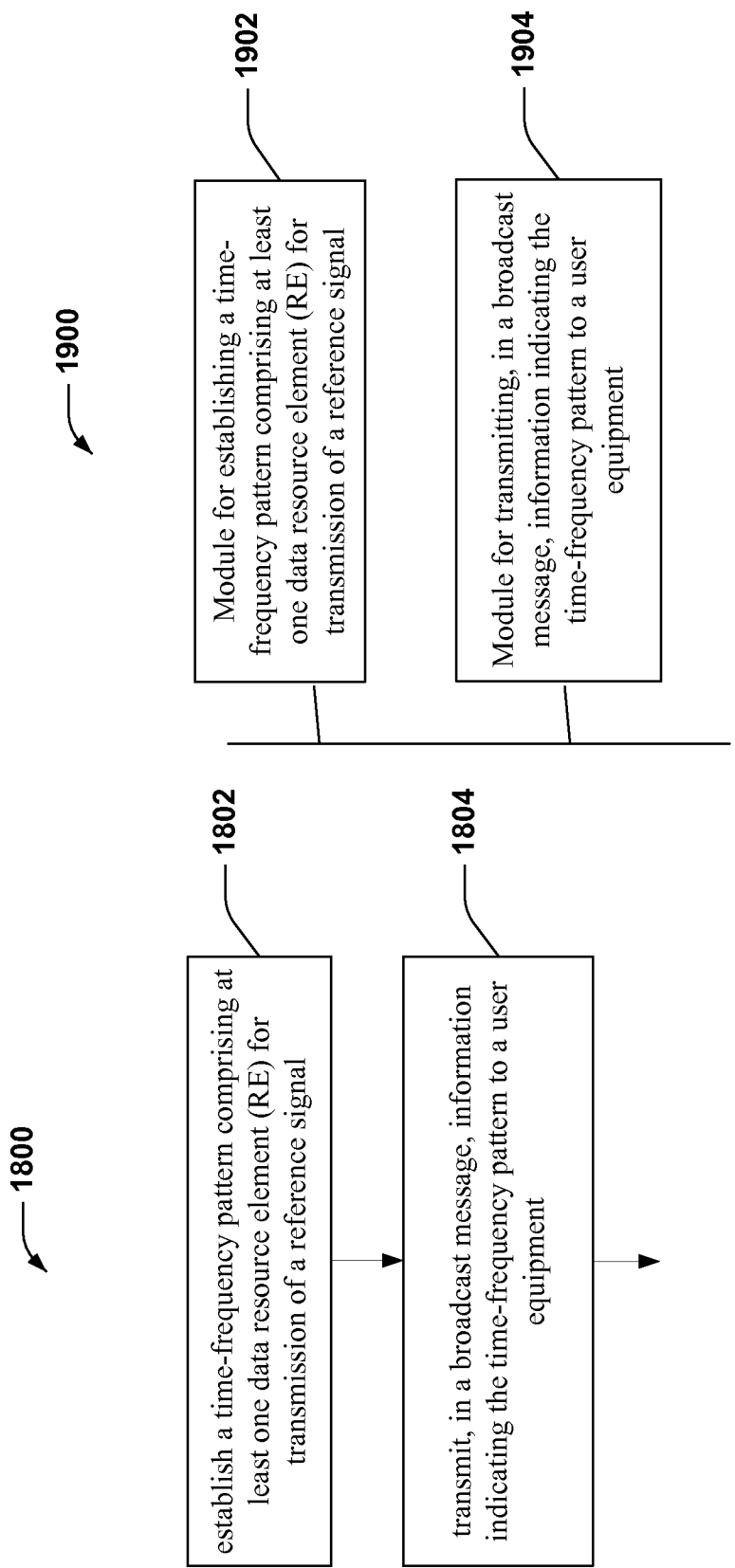

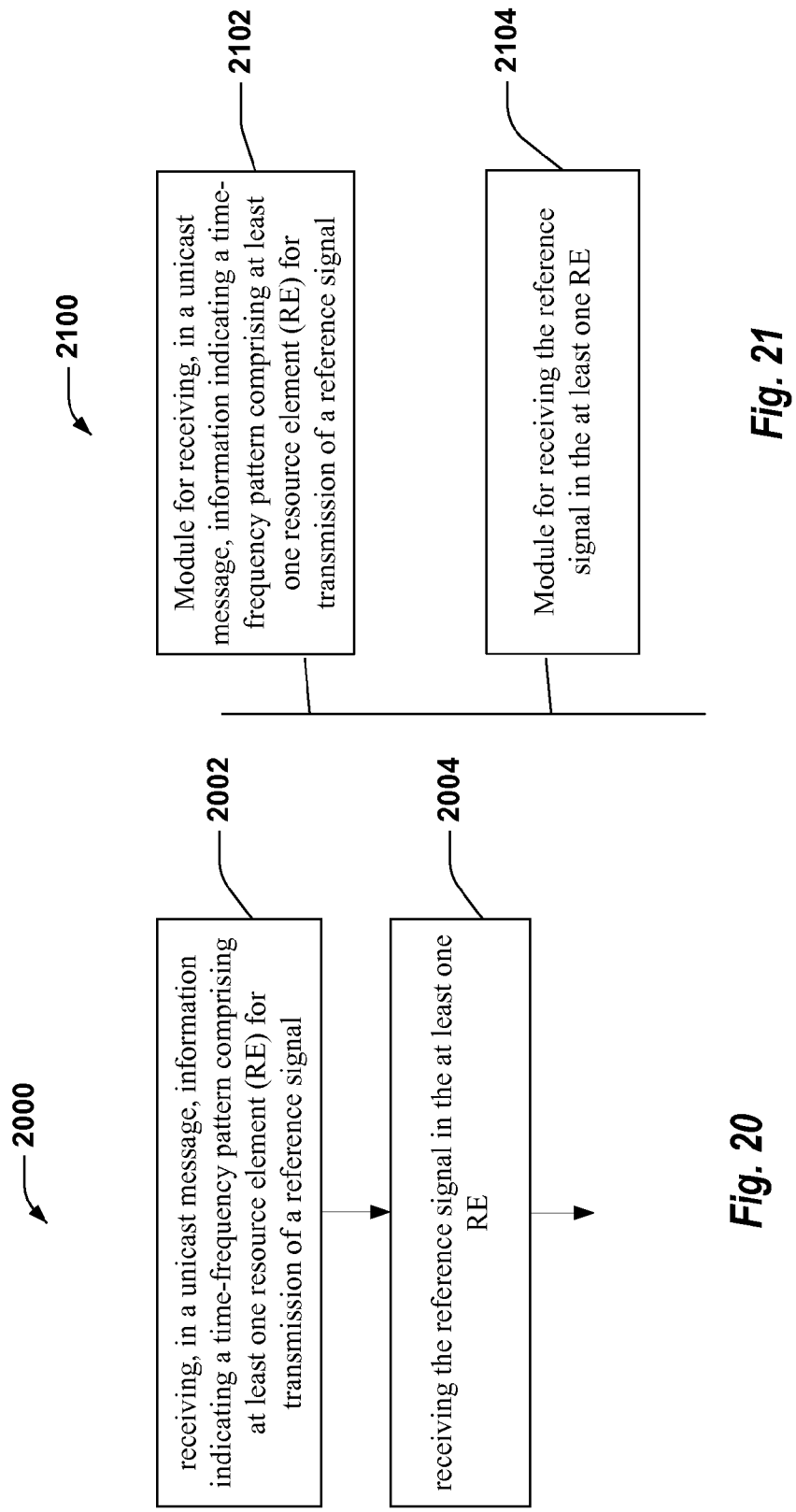

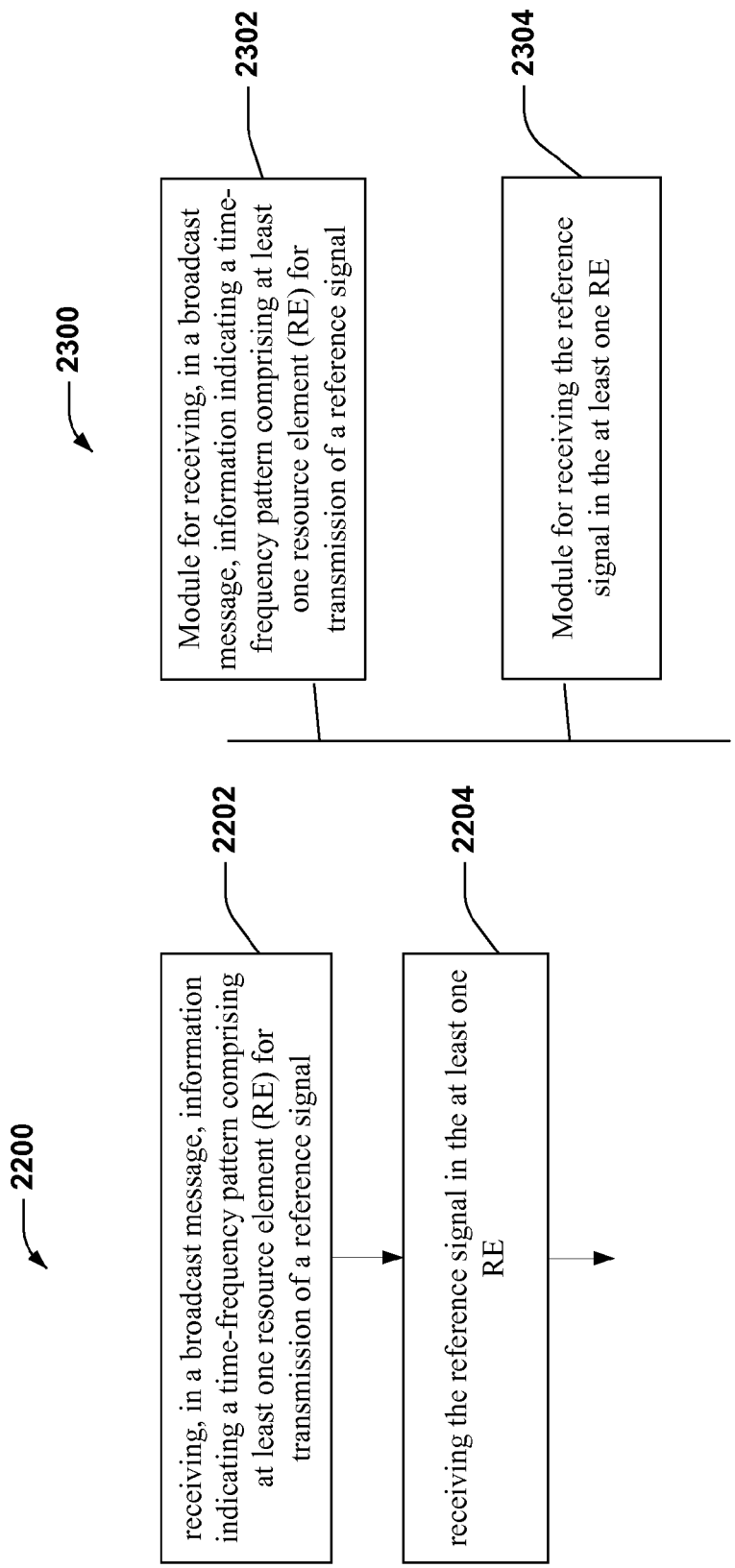

MUTING SCHEMES FOR CHANNEL STATE INFORMATION REFERENCE SIGNAL AND SIGNALING THEREOF

CROSS-REFERENCE TO RELATED APPLICATIONS

This application claims the benefit of priority from U.S. Provisional Patent Application Ser. No. 61/321,473, entitled "MUTING SCHEME FOR CHANNEL STATE INFORMATION REFERENCE SIGNAL AND SIGNALING THEREOF," filed on Apr. 6, 2010 and is a Continuation-in-Part of U.S. patent application Ser. No. 12/899,448, entitled "METHOD AND APPARATUS FOR USING CHANNEL STATE INFORMATION REFERENCE SIGNAL IN WIRELESS COMMUNICATION SYSTEM," filed Oct. 6, 2010, which claims the benefit of priority from U.S. Provisional Patent Application Ser. No. 61/249,906, entitled "METHOD AND APPARATUS FOR USING A CHANNEL SPATIAL INFORMATION REFERENCE SIGNAL IN A WIRELESS COMMUNICATION SYSTEM," filed on Oct. 8, 2009, and U.S. Provisional Application Ser. No. 61/257,187, entitled "METHOD AND APPARATUS FOR USING A CHANNEL SPATIAL INFORMATION REFERENCE SIGNAL IN A WIRELESS COMMUNICATION SYSTEM," filed on Nov. 2, 2009, each of which is herein incorporated by reference in its entirety.

BACKGROUND

I. Field

The following description relates generally to wireless communications, and more particularly to the use of channel state information reference signals in a wireless communication system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, a base station or terminal can transmit reference signals to maintain or improve performance of the wireless system. Reference signals are typically signals known a priori to a receiver. A receiving device may receive reference signals and based on the received reference signals may alter certain operational parameters or generate feedback to alter certain operational parameters of wireless communication. During the operation of a wireless system, the usefulness of references signals may diminish in the presence of interfering signals such as data or control signal transmissions from neighboring networks, or transmissions from different antennas of a transmitter. Furthermore, new reference signals may be transmitted using transmission resources in which legacy terminals may be expecting data transmissions.

SUMMARY

Briefly and in general terms, the disclosed designs provide methods and apparatuses for the use of channel state information reference signals (CSI-RS) and muted resource elements in a wireless communication network.

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one aspect, a method of wireless communication includes establishing a time-frequency muting pattern including at least one data resource element (RE) and transmitting information indicating the time-frequency muting pattern to a user equipment.

In another aspect, an apparatus for wireless communication includes means for establishing a time-frequency muting pattern including at least one data resource element (RE) and means for transmitting information indicating the time-frequency muting pattern to a user equipment.

In yet another aspect, a computer program product comprising a computer-readable medium storing computer-executable instructions is disclosed. The instructions may include code for establishing a time-frequency muting pattern including at least one data resource element (RE) and transmitting the time-frequency muting pattern to a user equipment.

In yet another aspect, an apparatus for wireless communication includes at least one processor and memory coupled to the at least one processor. The processor is configured to establish a time-frequency muting pattern including at least one data resource element (RE) and transmit the time-frequency muting pattern to a user equipment.

In yet another aspect, a wireless communication method includes transmitting data to a first user equipment that is aware of a reference signal transmission and a muting operation on data resources by performing one of a rate matching and a puncturing operation around resources allocated to the reference signal transmission and the muting operation and transmitting data to a second user equipment that is not aware of the reference signal transmission and the muting operation, by puncturing data transmission on resources allocated to the reference signal transmission and the muting operation.

In yet another aspect, a wireless communication apparatus includes means for transmitting data to a first user equipment that is aware of a reference signal transmission and a muting operation on data resources by performing one of a rate matching and a puncturing operation around resources allocated to the reference signal transmission and the muting operation and means for transmitting data to a second user equipment that is not aware of the reference signal transmission and the muting operation, by puncturing data transmission on resources allocated to the reference signal transmission and the muting operation.

In yet another aspect, a computer program product comprising a computer-readable medium storing computer-executable instructions is disclosed. The instructions may include code for transmitting data to a first user equipment that is aware of a reference signal transmission and a muting operation on data resources by performing one of a rate matching and a puncturing operation around resources allocated to the reference signal transmission and the muting operation and transmitting data to a second user equipment that is not aware of the reference signal transmission and the muting operation, by puncturing data transmission on resources allocated to the reference signal transmission and the muting operation.

In yet another aspect, a wireless communication method includes assigning a code profile to a user equipment and transmitting, to the user equipment, a resource muting pattern based on the assigned code profile.

In yet another aspect, a wireless communication apparatus includes means for assigning a code profile to a user equipment and means for transmitting, to the user equipment, a resource muting pattern based on the assigned code profile.

In yet another aspect, a wireless communication method includes receiving information related to a time-frequency muting pattern including at least one data resource element (RE) and receiving at least one data transmission using a transmission resource not included in the time-frequency muting pattern.

In yet another aspect, a wireless communication method includes receiving muting information related to a reference signal and calculating a transport block size using a scale factor based on the received muting information.

In yet another aspect, a wireless communication apparatus includes means for receiving muting information related to a reference signal and means for calculating a transport block size using a scale factor based on the received muting information.

In yet another aspect, a method of wireless communication includes establishing a time-frequency pattern including at least one data resource element (RE) for transmission of a reference signal and transmitting, in one of a unicast message and a broadcast message, information indicating the time-frequency pattern to a user equipment.

In yet another aspect, a wireless communication apparatus includes means for establishing a time-frequency pattern including at least one data resource element (RE) for transmission of a reference signal and means for transmitting, in one of a unicast message and a broadcast message, information indicating the time-frequency pattern to a user equipment.

In yet another aspect, a method of wireless communication includes receiving, in one of a unicast message and a broadcast message, information indicating a time-frequency pattern including at least one resource element (RE) for transmission of a reference signal and receiving the reference signal in the at least one RE.

In yet another aspect, a wireless communication apparatus includes means for receiving, in one of a unicast message and a broadcast message, information indicating a time-frequency pattern including at least one resource element (RE) for transmission of a reference signal and means for receiving the reference signal in the at least one RE.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 6 illustrates a flow chart representation of a process for wireless communication.

FIG. 7 illustrates a block diagram representation of a portion of a wireless communication apparatus.

FIG. 10 illustrates a flow chart representation of a process for wireless communication.

FIG. 11 illustrates a block diagram representation of a portion of a wireless communication apparatus.

FIG. 12 illustrates a flow chart representation of a process for wireless communication.

FIG. 13 illustrates a block diagram representation of a portion of a wireless communication apparatus.

FIG. 14 illustrates a flow chart representation of a process for wireless communication.

FIG. 15 illustrates a block diagram representation of a portion of a wireless communication apparatus.

FIG. 18 illustrates a flow chart representation of a process for wireless communication.

FIG. 19 illustrates a block diagram representation of a portion of a wireless communication apparatus.

FIG. 20 illustrates a flow chart representation of a process for wireless communication.

FIG. 21 illustrates a block diagram representation of a portion of a wireless communication apparatus.

FIG. 22 illustrates a flow chart representation of a process for wireless communication.

FIG. 23 illustrates a block diagram representation of a portion of a wireless communication apparatus.

DESCRIPTION

Figure 1:
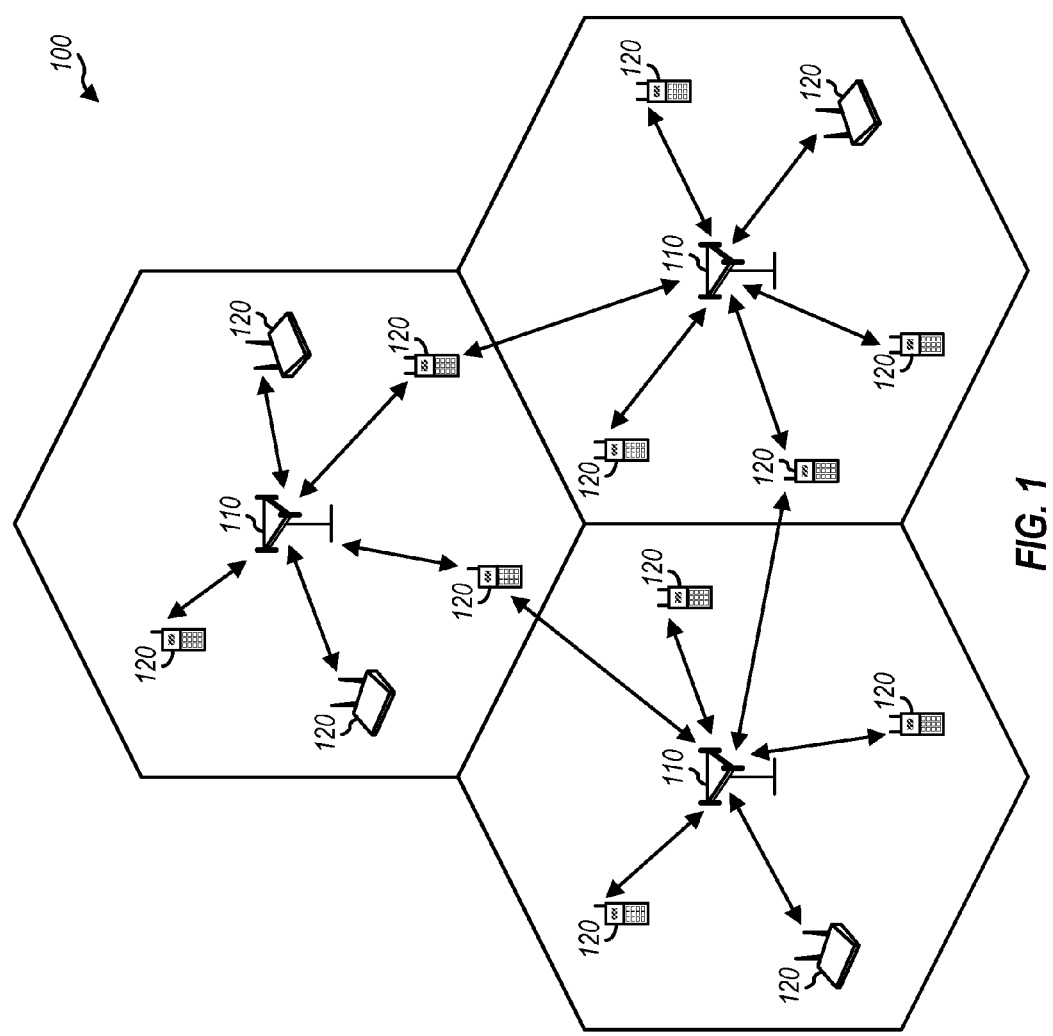
FIG. 1 illustrates a multiple access wireless communication system according to one embodiment.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is used for uplink multiple access scheme in LTE.

It should be noted that for clarity, the subject matter below is discussed with respect to specific examples of certain signals and message formats used in LTE and with respect to the channel state information reference signal (CSI-RS) and muting technology. However, the applicability of the disclosed techniques to other communication systems and other reference signal transmission/reception technology will be appreciated by one of skill in the art.

Furthermore, various combinations of antenna ports and transmission resource assignments are depicted in FIGS. 3A to 3D and 4 using the resource block map technique in which a two dimensional plot of available resources in a transmission resource block (RB) are depicted with symbols (or time) along the horizontal direction and frequency (or sub-carrier index) along the vertical direction. Furthermore, for the sake of clarity, the resource elements (REs) in each depicted RB are labeled with a corresponding antenna port group/antenna index, which simply represent logical grouping of antennas. However, it is understood that the enumeration using alphabet sequence and numbers is for clarity of explanation only, and may or may not bear any relationship with an actual antenna arrangement on a device.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the user equipments (UEs) located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
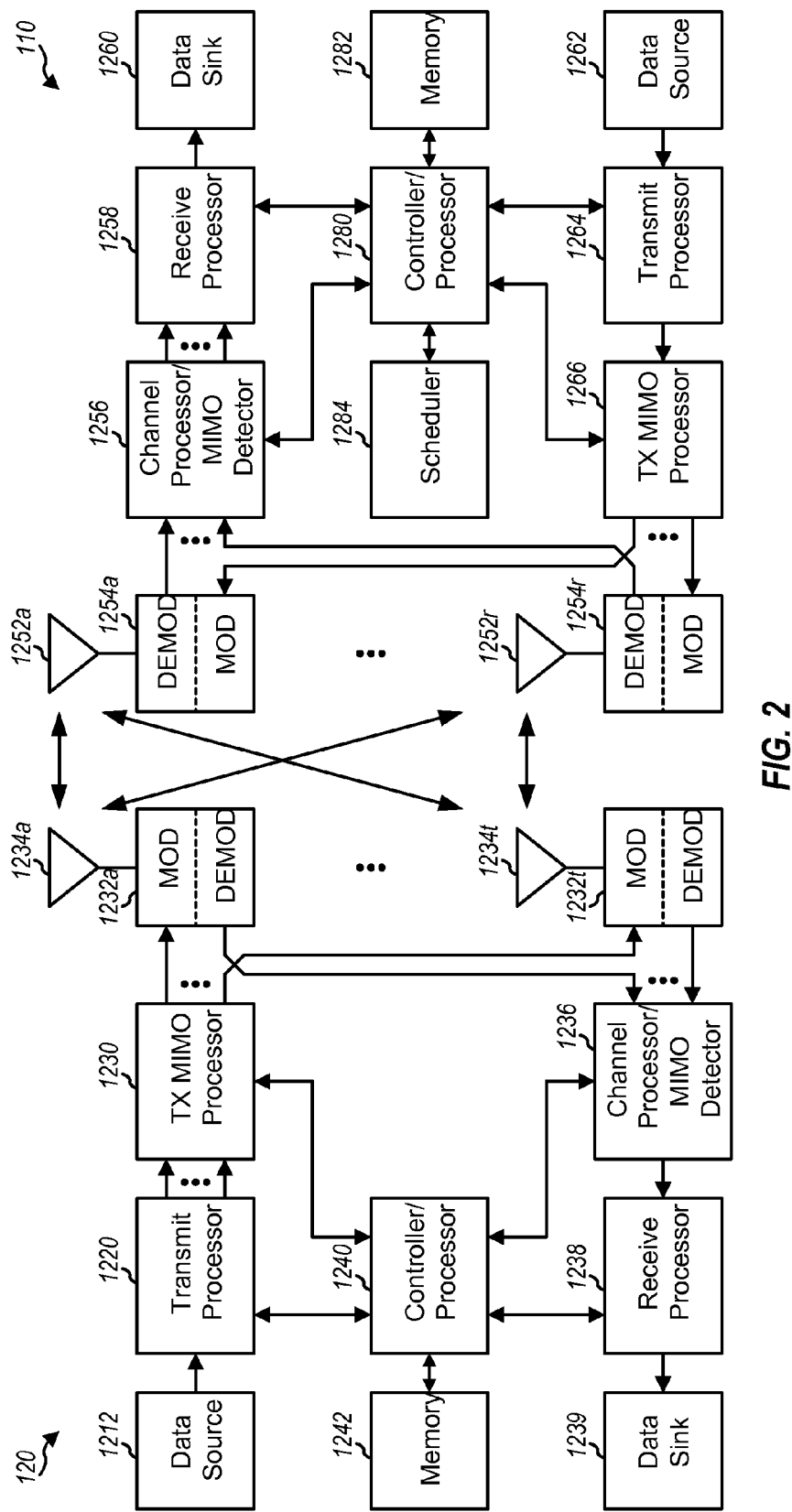
FIG. 2 illustrates a block diagram of a communication system.

FIG. 2 shows a block diagram of a design of an exemplary base station/eNB 110 and a UE 120, which may be one of the eNBs and one of the UEs in FIG. 1. A UE 120 may be equipped with T antennas 1234*a* through 1234*t*, and base station 110 may be equipped with R antennas 1252*a* through 1252*r*, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232*a* through 1232*t*. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232*a* through 1232*t* may be transmitted via T antennas 1234*a* through 1234*t*, respectively.

At base station 110, antennas 1252*a* through 1252*r* may receive the uplink signals from UE 120 and provide received signals to demodulators (DEMODs) 1254*a* through 1254*r*, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254*a* through 1254*r*. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254*a* through 1254*r*, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 1200 in FIG. 12 or process 1400 in FIG. 14 and/or other processes for the techniques described herein. Processor 1256, processor 1280, and/or other processors and modules at base station 110 may perform or direct processes 600, 800 or 1000 in FIG. 6, 8 or 10 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

In LTE Advanced (LTE-A), two new types of reference signals are introduced. The first reference signal is called user equipment reference signal (UE-RS) which is sent along with data for data demodulation, therefore sometimes also referred to as demodulation reference signal (DM-RS), and channel state information reference signal (CSI-RS), which is transmitted periodically and that may be used by an LTE-A user equipment (UE) for CSI feedback computation.

Figure 3A:
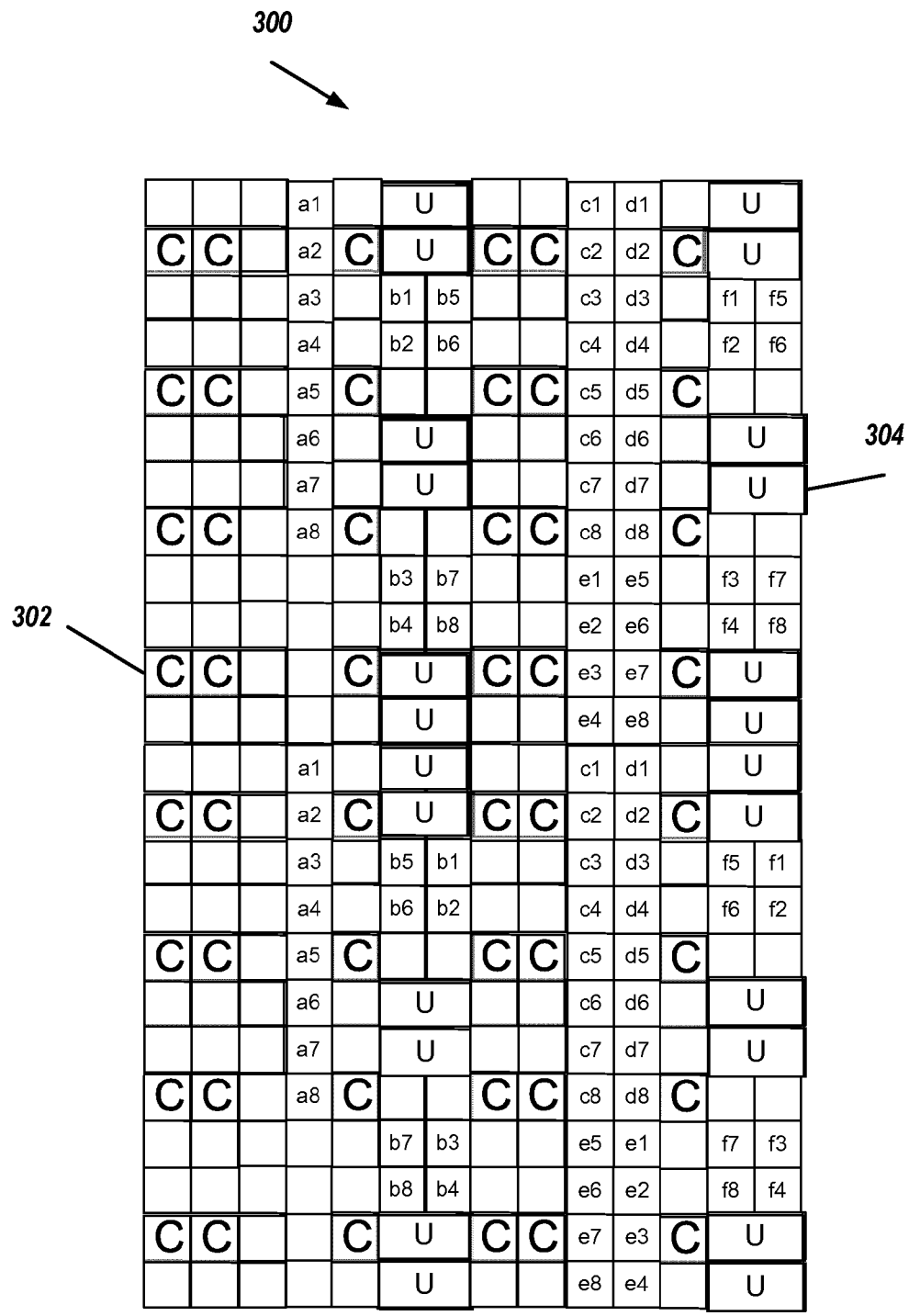
FIG. 3A illustrates a block diagram representation of two adjacent resource blocks used in a wireless communication system.

FIG. 3A is a block diagram representation 300 of two adjacent resource blocks, depicting REs assigned to CSI-RS, in some designs. The allocated REs are labeled using a two character combination of an alphabet (a, b, c, d, e or f) representing a group of antenna ports and a number (1 to 8), representing an antenna port index. A base station with eight transmit antenna ports (8Tx) may select one of the groups "a" to "f" and may use the remaining CSI-RS REs for data transmissions. The RE assignment pattern depicted in FIG. 3A allows orthogonal multiplexing of 6 different eNBs 110 with 8Tx antennas each (each eNB 110 using one of the six groups "a" to "f"). The design assumes that a resource density of 1 RE/RB is use for CSI-RS. Note that some REs may not be available for transmission of CSI-RS. The unavailable REs include, for example, REs 302 allocated to cell-specific reference signal (CRS), marked with alphabet "C" in FIG. 3A, and REs 304 allocated to user equipment reference signal (UE-RS), marked with alphabet "U" in FIG. 3A.

Figure 3B:
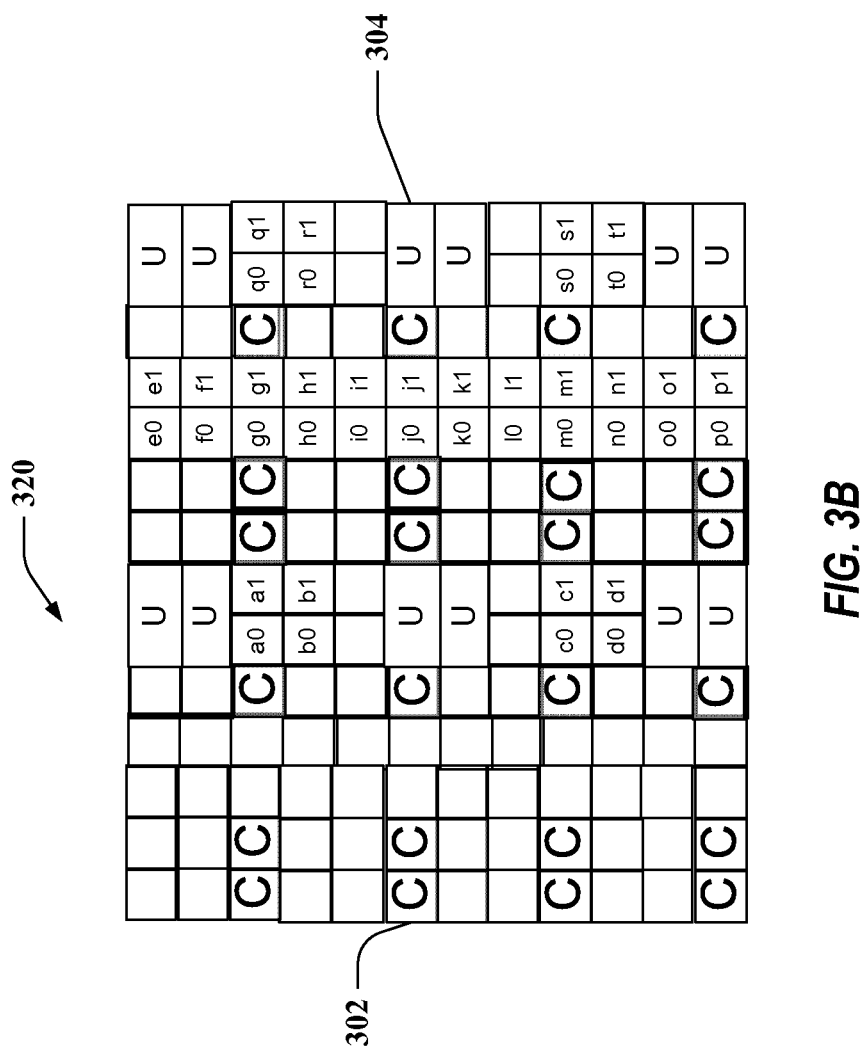
FIG. 3B illustrates a block diagram representation of a resource pattern used in a wireless communication system comprising 2 channel state information reference signal (CSI-RS) ports.
Figure 3C:
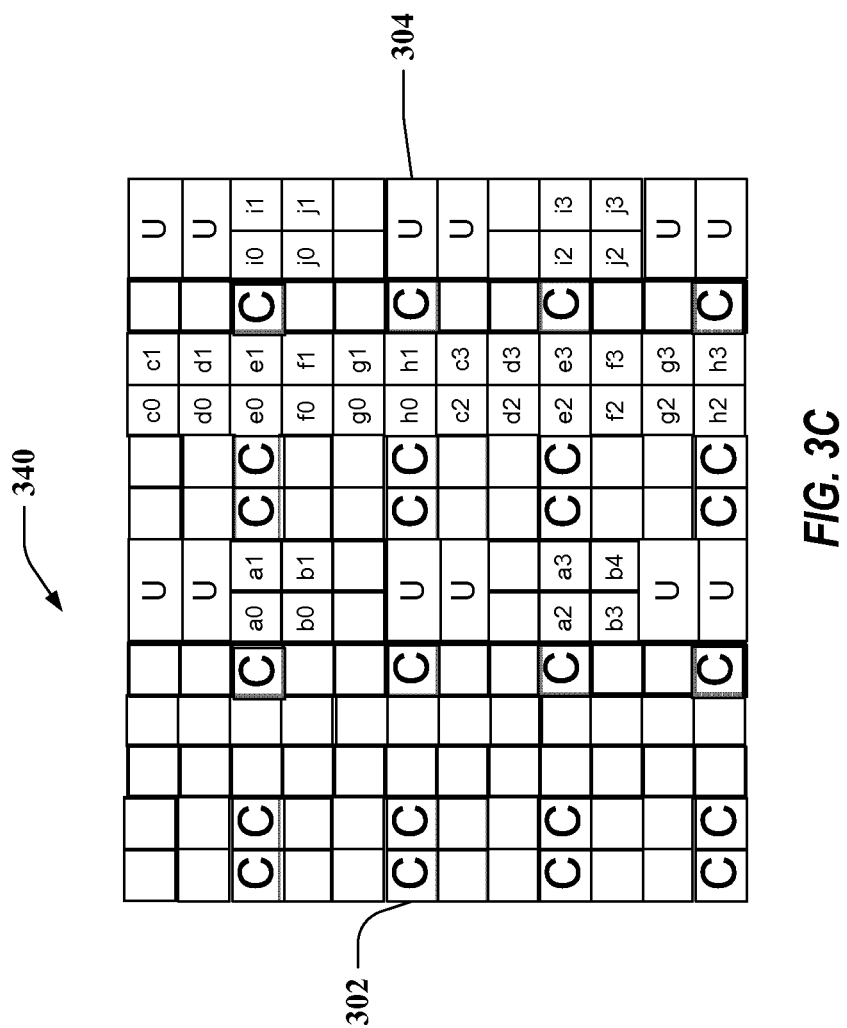
FIG. 3C illustrates a block diagram representation of a resource block used in a wireless communication system comprising 4 channel state information reference signal (CSI-RS) ports.
Figure 3D:
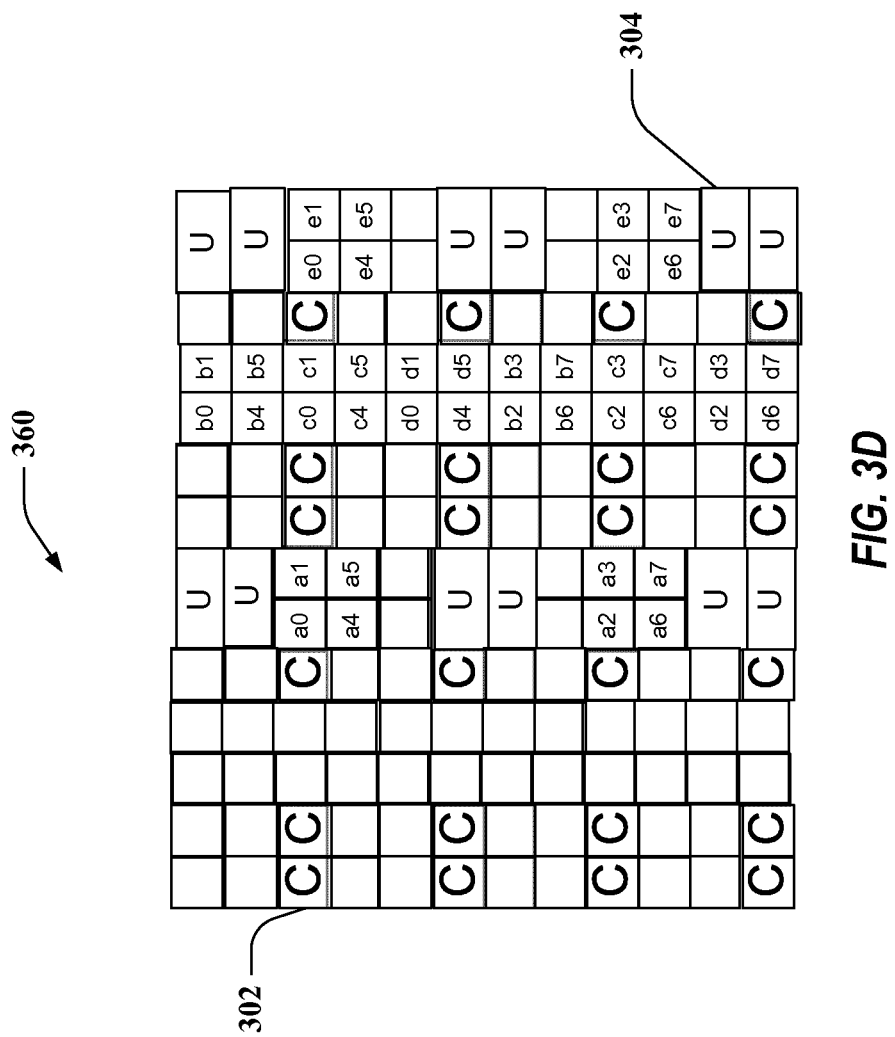
FIG. 3D illustrates a block diagram representation of a resource block used in a wireless communication system comprising 8 channel state information reference signal (CSI-RS) ports.

Referring now to FIGS. 3B to 3D, some example of RE assignments to CSI-RS signals, used in LTE Rel-10, are depicted. In FIGS. 3B, 3C and 3D, the REs marked with "C" may represent REs assigned to CRS and the REs marked "U" may represent REs assigned to UE-RS.

FIG. 3B is a block diagram representation of an RB 320 showing the RE pattern assignment to CSI-RS for the case of 2 CSI-RS ports in normal cyclic prefix (CP) subframes, for both frame structures (FS) FS 1 and FS 2.

FIG. 3C is a block diagram representation of an RB 340 showing the RE pattern assignment to CSI-RS for the case of 4 CSI-RS ports in normal cyclic prefix (CP) subframes, for both frame structures (FS) FS 1 and FS 2.

FIG. 3D is a block diagram representation of an RB 360 showing the RE pattern assignment to CSI-RS for the case of 8 CSI-RS ports in normal cyclic prefix (CP) subframes, for both frame structures (FS) FS 1 and FS 2.

Figure 4:
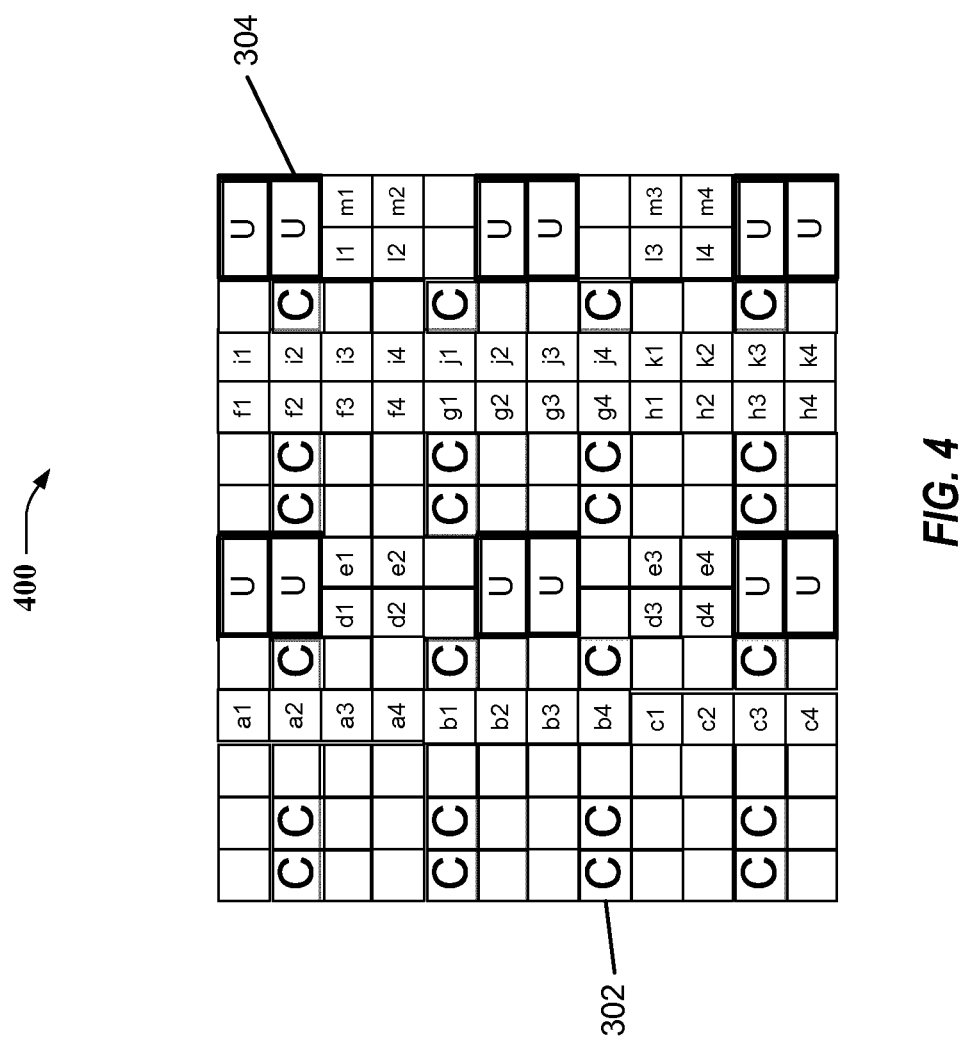
FIG. 4 illustrates a block diagram representation of a resource block used in a wireless communication system

FIG. 4 shows another resource allocation pattern 400 used for the allocation of REs to the transmission of CSI-RS. The resource allocation pattern 400 shows REs 302 assigned to CRS and REs 304, assigned to UE-RS. Of the remaining REs, REs available for CSI-RS transmissions are assigned to four port antennas "a" through "m." It will be appreciated that the resource allocation patterns 300 and 400 are for illustrative purpose only and do not limit the subject technology in any way. It will further be understood that while resource allocation patterns 300 and 400 show the allocation of REs for transmission of CSI-RS, in a given cell, only a subset of all possible CSI-REs may be utilized for actual CSI-RS transmissions. The remaining un-utilized REs may be used for either data transmissions or may be muted, as further discussed below.

In some designs, the CSI-RS may be transmitted in the physical downlink shared channel (PDSCH) region of a subframe. In some designs, CSI-RS transmissions may be wideband, usually spanning the entire bandwidth (BW). In some systems, the CSI-RS density may be chosen to be 1 resource element (RE) per resource block (RB) per antenna port. This resource density may, in one aspect, provide sufficient channel estimation quality for applications where UE 120 has to measure the channel to the eNB 110 with the strongest received signal, corresponding to a cell (called cell A). However, in future revisions of LTE-A, the UE 120 may need to estimate the channels of neighboring cells whose received power may be lower than that of the cell A eNB 110. For example, in heterogeneous networks (HetNets) employing Range Extension, HetNets with closed subscriber group (CSG) cells or networks employing cooperative multi-point (CoMP) schemes such as joint transmission or coordinated beamforming, the UE 120 needs to estimate the channel of cells in which the received eNB 110 transmissions may be weaker than that of cell A eNB 110.

In some designs, the cell with the strongest received power (cell A) could mute the CSI-RS REs corresponding to the CSI-RS REs of the weaker cell(s). In other words, cell A eNB 110 may refrain from transmitting any data (or other signals) on the CSI-RS REs of the weaker cells of interest. Therefore, in some designs a muting pattern (further explained below) assigned in one cell may coincide with transmission resources allocated to a reference signal transmission in a neighboring cell.

From the perspective of a UE 120, while muting may help reduce interference into a wanted CSI-RS signal from other unwanted transmissions (e.g., data transmissions from cell A), muting also may result in "missing" data at REs where data would otherwise have been transmitted. Therefore, in some designs, strategies may be used at eNB 110 and/or UE 120 to overcome any possible detrimental effect of muted REs in data transmissions.

In some designs, the eNB 110 may rate match around the muted tones for UEs 120 aware of the muting. Alternatively, in some designs, the eNB 110 may simply puncture the muted tones. In some designs, information regarding whether rate matching is performed or puncturing is performed may be conveyed to the UE 120 that are aware of the muting operation. In some designs, UEs 120 that are not aware of muting may operate in a wireless network. For such UEs 120 not aware of muting, the eNB 110 may simply puncture the data tones. In some designs, when a transmission is meant to be received by more than one UEs that include a UE 120 not aware of the muting operation, then puncturing may be used for data transmission to the UEs 120.

Figure 5:
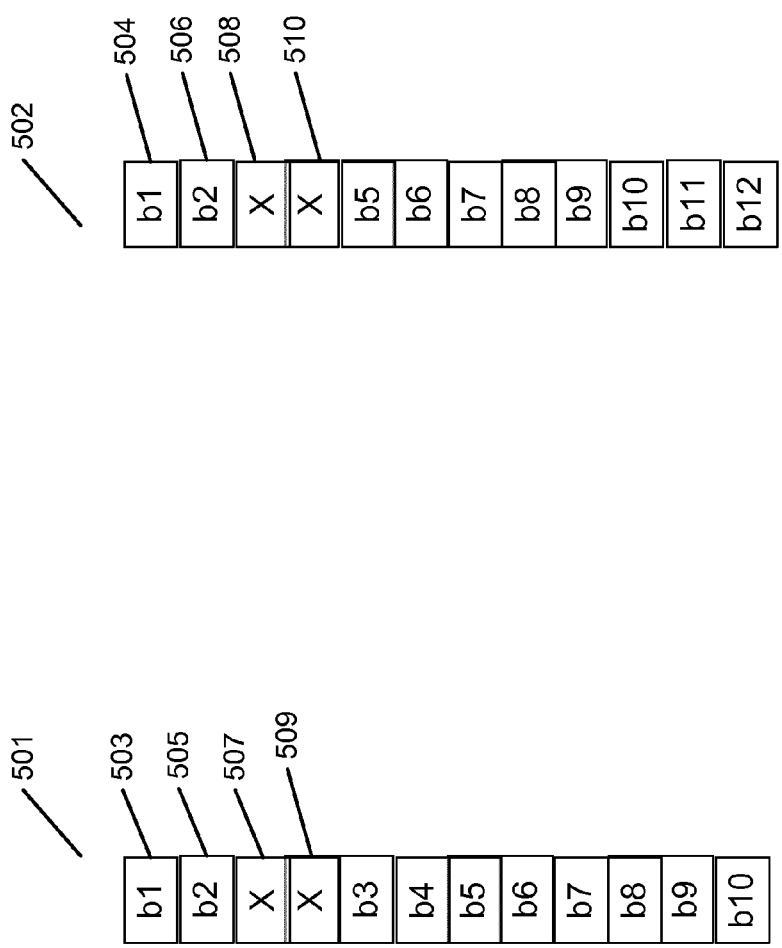
FIG. 5 illustrates a block diagram representation of data allocation patterns used in a wireless communication system.

With reference to FIG. 5, a block diagram representation of two exemplary resource patterns 501 and 502, used in a wireless communication system, are depicted. For the sake of clarity, only the twelve REs corresponding to a single symbol within a single RB are depicted.

In some designs, as depicted in the resource pattern 501, data modulation symbols may be allocated to subcarriers starting from the top of the resource pattern 501 without loss of generality, sequentially going to the bottom of the resource pattern 501, by allocating modulation symbols to each next available data RE. In the depicted example, the first two data modulation symbols b1 and b2 are assigned to REs 503 and 505. However, no data modulation symbols are allocated for transmission in the REs 507 and 509, which are muted (or assigned to CSI-RS transmissions). The next data modulation symbols b3 to b10 are then sequentially allocated to the remaining REs in the resource pattern 501. It will be appreciated that the data modulation symbols b1 to b10 are thus allocated to REs by rate matching around the muted REs. While not depicted in FIG. 5, it is understood that the next modulation symbols b11, b12 may be allocated beginning from the top RE in the next allocated data RB of the same OFDM symbol or in the next symbol in which data is to be transmitted.

In some designs, as depicted in the resource pattern 502, data modulation symbols may be allocated to subcarriers starting from the top of the resource pattern 502 without loss of generality, sequentially going to the bottom of the resource pattern 502, by allocating modulation symbols to each next available data RE. In the depicted example, the first two data modulation symbols b1 and b2 are assigned to REs 504 and 506. However, no data modulation symbols are allocated for transmission in the REs 508 and 510, which are muted (or assigned to CSI-RS transmissions). The modulation symbols b3 and b4, that would have been allocated to the muted REs 508, 510 are not allocated any transmission resources. The next data modulation symbols b5 to b12 are then sequentially allocated to the remaining REs in the resource pattern 502. Therefore, in the resource pattern 502, the transmitted data modulation symbols are punctured at the locations of muted REs (or CSI-RS REs).

In some designs, the eNB 110 may signal to the UEs 120, a CSI-RS pattern and a muting pattern. The CSI-RS pattern may provide the UEs 120 information about which REs from all possible CSI-RS REs are being used for CSI-RS transmissions by the eNB 110. The muting pattern may provide the UEs 120 information about which REs from all possible CSI-RS REs are muted (i.e., no signal being transmitted) by the eNB 110. In some designs, the eNB 110 may also signal to the UEs 120 the number of CSI-RS ports and the number of muted tones. In some designs, the signaling of muting pattern or the CSI-RS pattern may be transmitted to the UEs 120 by transmitting a higher layer message such as radio resource control (RRC) signaling. In some designs, the muting pattern information or the CSI-RS pattern information may be included in broadcast channels such as system information blocks (SIBs). In some designs, the muting information or the CSI-RS pattern information may be unicast to the UEs 120.

In some designs, muting of each RE may be possible individually, and may thus be indicated in a bitmap on an RE by RE basis. The bitmap may be transmitted from the eNB 110 to each UE 120, as described in greater detail below. To reduce the signaling overhead of a bitmap which includes a bit per RE and also to reduce the number of possible muting configurations, muting may be performed in group of REs called muting groups. For example, a single bit in the bitmap may indicate whether all REs in a muting group are muted or not. In general, different muting groups may have different number of REs and may also have overlapping REs.

In some designs, the muting groups may only comprise REs that could be used for transmission of a reference signal, such as CSI-RS. For example, in some designs, the muting groups may correspond to CSI-RS pattern corresponding to a fixed number of antenna ports, such as 4-port CSI-RS patterns discussed above with respect to FIGS. 3C and 4.

In some designs, a bitmap may be transmitted, indicating the muting status of each antenna group. In one aspect, the transmission of a muting bitmap gives full flexibility in muting (i.e., muting pattern can be random or can be dynamically changed over a period of time by transmitting bitmaps multiple times) In some designs, the bitmap may comprise a sequences of 1s and 0s, in which, without loss of generality, 1s may indicate the locations of muted REs (or RE groups).

In some designs, because muting is to be used to mute locations corresponding to the CSI-RS transmissions in a neighboring cell, the muting groups used in a bearer cell may correspond to CSI-RS patterns possible in the neighboring cell. For example, if the muting groups in the bearer cell all include 8 REs, then it may be possible to choose muting groups in the bearer cell to correspond to 8 Tx CSI-RS patterns used in a neighboring cell. However, if neighboring eNBs 110 are using 2 or 4 port CSI-RS RE patterns, then the eNB 110 in the bearer cell may mute in groups of 8 REs, which may be unnecessarily higher than the CSI-RS REs in the neighboring cell.

However, if the muting groups used in the bearer cell comprise 2 REs, the muting groups may be chosen to correspond to all 2 port CSI-RS RE patterns. Because of the nested property of CSI-RS resource patterns (i.e., CSI-RS REs for a higher number of antenna ports, e.g., 8 or 4, corresponds to multiple CSI-RS REs for a lower number of antenna ports, e.g., 4 or 2), this selection advantageously allows for the selection of muting groups to coincide with any CSI-RS pattern used in a neighboring cell. Therefore, in one aspect, selecting muting groups in the bearer cell to correspond to 2 Tx antenna port CSI-RS REs may provide greater flexibility but also may need a greater amount of bit overhead to signal the muting groups. In some designs, all possible 4 port (4 Tx) CSI-RS patterns may be used as muting groups, thereby reducing the number of bits required to signal the muting pattern, but requiring to mute an entire 4 RE group for muting at REs of a neighboring 1 or 2 antenna port CSI-RS transmitting eNB 110.

To reduce the signaling overhead (e.g., the muting bitmap), in some designs, a lower bound and an upper bound on the number of muted REs may be used whenever muting is employed. The lower limit may be greater than zero (i.e., at least some REs are muted). The upper limit may be less than the number of all possible CSI-RS REs that can be muted. For example, in some designs, when muting is enabled, at least 4 REs may be muted and beyond 16 REs may not be muted. Referring back to FIGS. 3A to 3D and 4, in some designs, up to 60 REs may be available in an RB for CSI-RS transmission, out of which, as discussed above, a maximum of 16 REs may be muted. In addition the combinations of groups that can be simultaneously muted may be limited in other manners. In some designs, the information about how the muting pattern changes with time or frequency may also be indicated. For example a subband bitmap could indicate which subbands are muted. In some designs, the muting pattern may be repeated with a periodicity and subframe index offset and the periodicity and offset may be signaled to the UEs 120. The muting periodicity and offset may help a UE 120 identify the subframes with muted REs.

In some designs, it may be beneficial to limit the number of allowed muting patterns and CSI-RS patterns, the number of ports being used for CSI-RS transmissions, and so on, of different cells (i.e., different eNBs 110) based on other parameters of the cell. In some designs, the CSI-RS and muting configuration allowed to be used by the eNB 110 may be a function of cell ID. In some designs, the CSI-RS and muting configuration allowed to be used by the eNB 110 may be a function of power class of the eNB 110, e.g., macro or pico or femto eNB 110 may use different muting strategies. For example, a femto cell may mute RE locations corresponding to a macro eNB 110. One reason for such a muting by a femto cell is to ensure that a UE 120 is able to have a good channel for CSI-RS with the macro cell. Similarly, a macro eNB 110 may mute REs used by a pico eNB 110 for CSI-RS to allow the UE 120 to maintain a good channel with the pico eNB 110.

In some designs, reduced reuse factor techniques may be used to reduce muting pattern signaling overhead. For example, with reference to FIG. 4, the REs available for CSI-RS transmissions may comprise 13 patterns for 4 Tx case and an eNB 110 with 4 Tx could use 1 of the 13 available patterns ("a" through "m"). Similarly, an eNB 110 with 2 Tx antennas could 1 in 26 possible patterns. This level of flexibility may require the use of a significant amount of bits to indicate which CSI-RS pattern is being used at a given time. Alternatively, in some designs, the number of CSI-RS patterns for eNBs 110 with fewer antennas (e.g., two of four) may be limited. For example, with reference to FIG. 4, for 4 Tx, the eNB 110 could limit muting to only REs b1 to b4, e1 to e4, g1 to g4, j1 to j4, k1 to k4 and m1 to m4.

In one aspect, while such a scheme reduced the reuse factor for CSI-RS for 4 Tx, the signaling overhead for indicating the muting may be reduced (because the REs excluded from possible CSI-RS assignments need not be muted). In one aspect, such a grouping of muting patterns into muting groups (e.g., all REs for antenna "b" are muted together) may help reduce the number of bits required to signal the muting pattern, because instead of signaling individual REs, RE groups may be signaled instead. It will further be appreciated that, in some designs, the muting groups, as indicated above, correspond to CSI-RS RE pattern (e.g., 4-port CSI-RS pattern depicted in FIG. 4).

In a multicarrier system the muting pattern for each carrier may be independently controlled. In some designs, only certain combinations, known a priori to the eNB 110 and the UE 120, of muting could be allowed across carriers. For example, in some designs the muting patterns for all the carriers could be identical. In this case the signaling of muting could be common for all carriers.

Referring again to FIG. 5, it will be appreciated that when REs are muted, as depicted in resource patterns 501 and 502, legacy UEs 120 that are not aware of the muting may find it difficult to successfully receive the transmitted bits. In some designs, the eNB 110 may avoid scheduling data transmissions for UEs 120 that not aware of the muting in the subframes in which REs are muted. In some designs, to ensure that a UE 120 that is not aware of the muting operation may still be able to receive the transmitted data bits by scheduling UEs 120 with low modulation and coding scheme (MCS) or low coding rate or have small data allocations or target a later termination. In some designs, the eNB 110 may skip muting REs within data transmission to some UEs 120 configured for muting operation, while continuing muting for other UEs 120, depending on UE type, traffic priority/type, coding rate, MCS to be used, data allocation granularity, and so on.

As discussed above, the eNB 110 may determine whether a given UE 120 aware of a reference signal transmission and a muting operation. The determination may be made, for example, based on a revision number of the UE 120 or based on explicitly querying the UE 120. When the eNB 110 determines that the UE 120 is aware of the reference signal and muting operation, the eNB 110 may employ either rate matching or puncturing around the resource allocated to the reference signal transmission and transmit data to the UE 120 accordingly. Similarly, in some designs, when the eNB 110 determines that the UE 120 is not aware of the reference signal (e.g., CSI-RS) and muting operations, then the eNB 110 may transmit data to the UE 120 by puncturing around the muted REs.

In some designs, a UE 120 that is aware that muting of REs could happen may detect locations of muted REs by using a technique such as comparing average energy of received tones with a reference level based on other successfully received subcarriers. Other techniques are also well known in the art, the description of which has been omitted for brevity.

In another related aspect, some UEs 120 may interpret the MCS differently on subframes with muting and/or CSI-RS transmissions. Such a behavior of the UE 120 may depend on a code profile of the UE 120 (e.g., release version of the code). For example, in downlink pilot time slot (DwPTs) subframes, the transport block size determined may be a factor (e.g., 0.75) times the value obtained from the MCS table which is used in non-DwPTs subframes. This scaling may be performed because the number of useful REs in the DwPTs subframes is small. Some UEs 120 may use a similar approach in subframes in which REs are muted or used for reference signal transmissions. Therefore, in one aspect, the code profile of a UE 120, may be indicative of the transmission coding scheme used for data transmission to the UE 120.

In some designs, such as described in the co-pending U.S. patent application Ser. No. 13/032,592, entitled "CHANNEL STATE INFORMATION REFERENCE SIGNALS," the relevant portion of which is incorporated herein by reference, the REs not assigned to CSI-RS may be used for data transmissions using a combination of space frequency block coding (SFBC) or SFBC-frequency shift time diversity (SFBC-FSTD) coding. However, in some designs, e.g., when 2 CSI-RS ports are used for CSI-RS RE allocation, two entire OFDM symbols containing CSI-RS from a subframe may not be used for data transmission using SFBC/SFBC-FSTD schemes. Furthermore, in the above-referenced U.S. application Ser. No. 13/032,592, several designs were disclosed in which several OFDM symbols may be skipped for SFBC mapping when muting and CSI-RS may both be present in a subframe.

Furthermore, in some designs, when SFBC is used for transmissions to a particular UE 120, and when an RE is not paired with another RE for forming a coding group for transmission, the ungrouped RE may be muted for transmission to the particular UE 120, and data may be correspondingly rate matched around the ungrouped and muted RE. The muting information for that ungrouped RE may be transmitted to the particular UE 120.

In some designs, for UEs 120 for which SFBC coded data transmissions may be performed more often, a muting pattern that avoids the above described condition and wasting of data REs may be selected and signaled to the UE 120. For other UEs 120, such as UEs 120 that may not be using SFBC often, only the actual muted REs may be signaled, knowing that data REs may be wasted, if these UEs 120 get scheduled with SFBC coding. In some designs, data is rate matched for each UE 120 based on the muting pattern that is signaled to the UE 120.

Therefore, in some designs, different muting patterns may be transmitted to different UEs 120, based a likelihood of the UE 120 using the SFBC/SFBC-FSTD scheme. In some designs, the muting pattern chosen for a UE 120 may be chosen to minimize the wasted REs for SFBC UEs and may for example include the actual muted REs. The eNB 110 may assign a "code profile" to a UE 120, indicative of the likelihood of the transmission coding scheme used for the UE 120. For example, for newer (Rel-10) UEs 120, the code profile may indicate that SFBC/SFBC-FSTD is used more often. A muting pattern may be selected based on the code profile, as discussed above, and indicated to the UE 120 using the above discussed muting pattern indication methods.

FIG. 6 is a flow chart representation of a process 600 of wireless communication. At block 602, a time-frequency muting pattern comprising at least one data resource element (RE) is established. The muting pattern may be established using one of several designs disclosed above. At block 604, information indicating the time-frequency muting pattern is transmitted to a user equipment. As previously discussed, the information indicating the muting pattern may be transmitted in a unicast or a broadcast message to the UE 120. In some designs, the establishing the muting pattern includes grouping a plurality of REs into muting groups such that the time-frequency muting pattern comprises the muting groups. In some designs, each muting group may comprise REs that corresponding to a reference signal pattern, such as CSI-RS. In some designs, the muting pattern may correspond to a 4-port CSI-RS pattern. The number of REs in a muting group may be based on a number of transmit antenna ports (e.g., 1, 2, 4 or 8). In some designs, the time-frequency muting pattern may be based on a power class of the transmitter of the reference signal.

FIG. 7 is a block diagram representation of a portion of a wireless communication apparatus 700. The module 702 is for establishing a time-frequency muting pattern comprising at least one data resource element (RE). The module 704 is for transmitting information indicating the time-frequency muting pattern to a user equipment. The communication apparatus 700 and modules 702 and 704 may further be configured to implement various techniques discussed previously.

Figures 8, 9:
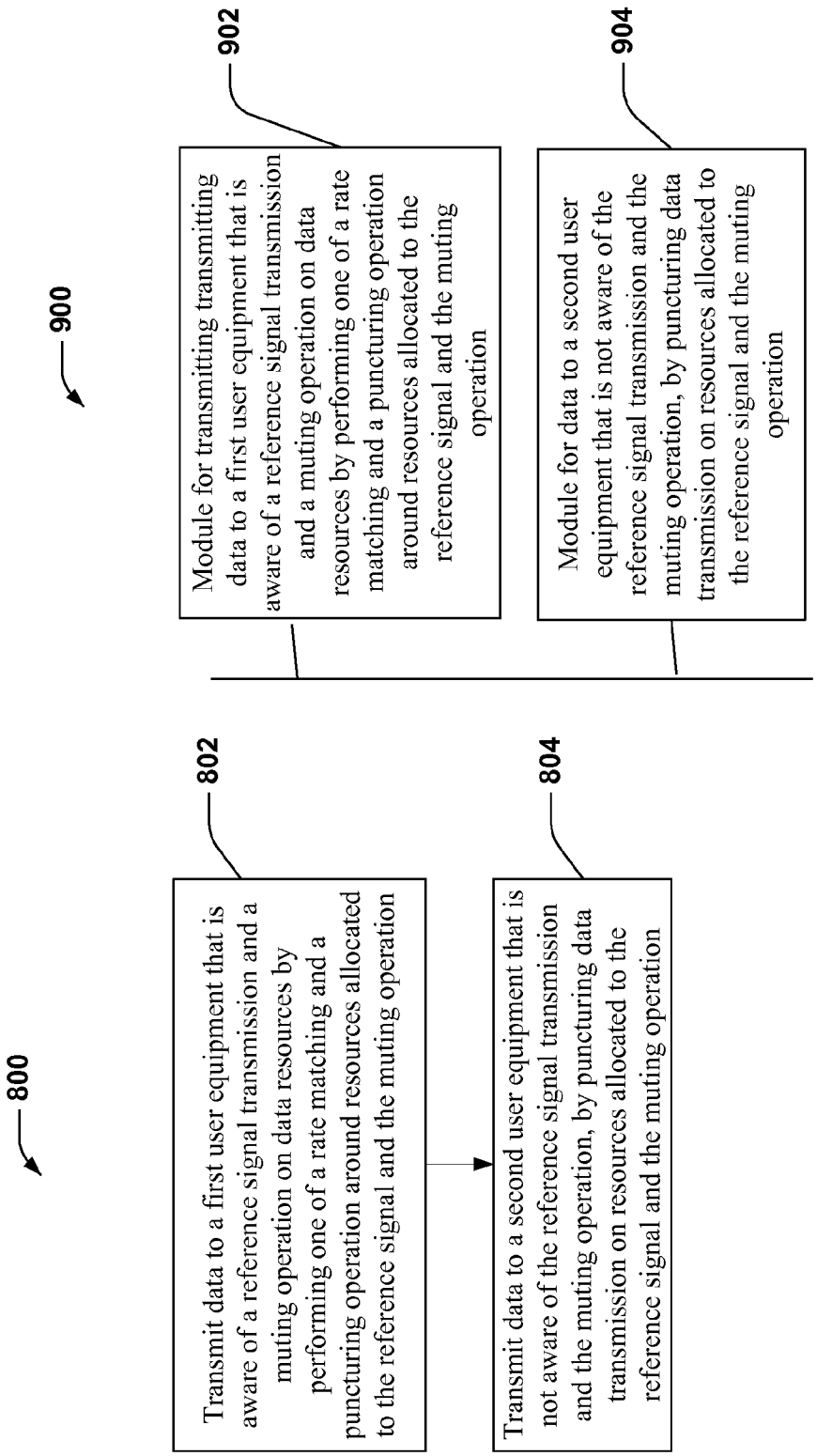
FIG. 8 illustrates a flow chart representation of a process for wireless communication.
FIG. 9 illustrates a block diagram representation of a portion of a wireless communication apparatus.

FIG. 8 is a flow chart representation of a process 800 of wireless communication. At block 802, data is transmitted to a first user equipment that is aware of a reference signal transmission and a muting operation on data resources by performing one of a rate matching and a puncturing operation around resources allocated to the reference signal and the muting operation. At block 804, data is transmitted to a second user equipment that is not aware of the reference signal transmission and the muting operation, by puncturing data transmission on resources allocated to the reference signal and the muting operation.

FIG. 9 is a block diagram representation of a portion of a wireless communication apparatus 900. The module 902 is for transmitting data to a first user equipment that is aware of a reference signal transmission and a muting operation on data resources by performing one of a rate matching and a puncturing operation around resources allocated to the reference signal and the muting operation. The module 904 is for transmitting data to a second user equipment that is not aware of the reference signal transmission and the muting operation, by puncturing data transmission on resources allocated to the reference signal and the muting operation.

FIG. 10 is a flow chart representation of a process 1000 of wireless communication. At block 1002, a code profile is assigned to a user equipment. The code profile may be indicative of a likelihood of a transmission coding scheme used for data transmission to the UE 120. For example, space frequency block coding (SFBC) may be used for transmitting data to a UE 120 when the code profile of the UE 120 indicates that the UE 120 is able to receive SFBC-encoded data. At block 1004, a resource muting pattern based on the assigned code profile is transmitted to the user equipment.

FIG. 11 is a block diagram representation of a portion of a wireless communication apparatus 1100. The module 1102 is for assigning a code profile to a user equipment. The module 1104 is for transmitting, to the user equipment, a resource muting pattern based on the assigned code profile.

FIG. 12 is a flow chart representation of a process 1200 of wireless communication. At block 1202, information related to a time-frequency muting pattern comprising at least one data resource element (RE) is received. At block 1204, at least one data transmission using a transmission resource not included in the time-frequency muting pattern is received.

FIG. 13 is a block diagram representation of a portion of a wireless communication apparatus 1300. The module 1302 is for receiving information related to a time-frequency muting pattern comprising at least one data resource element (RE). The module 1304 is for receiving information related to a time-frequency muting pattern comprising at least one data resource element (RE).

FIG. 14 is a flow chart representation of a process 1400 of wireless communication. At block 1402, muting information related to a reference signal is received. At block 1404, a transport block size is calculated using a scale factor based on the received muting information.

FIG. 15 is a block diagram representation of a portion of a wireless communication apparatus 1500. The module 1502 is for receiving muting information related to a reference signal. The module 1504 is for calculating a transport block size using a scale factor based on the received muting information.

Figures 16, 17:
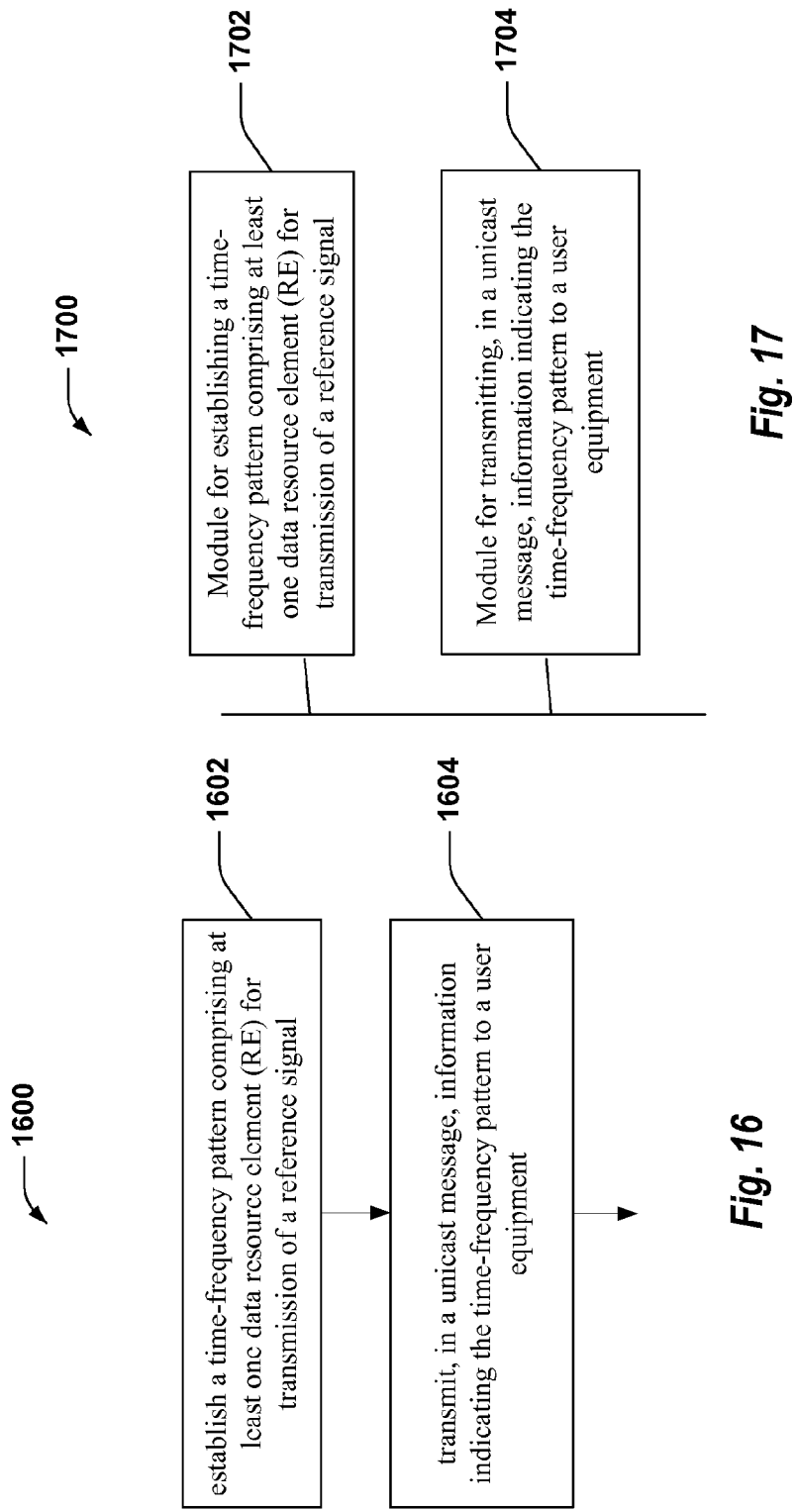
FIG. 16 illustrates a flow chart representation of a process for wireless communication.
FIG. 17 illustrates a block diagram representation of a portion of a wireless communication apparatus.

FIG. 16 is a flow chart representation of a process 1600 of wireless communication. At block 1602, a time-frequency pattern comprising at least one data resource element (RE) for transmission of a reference signal is established. The reference signal may be, e.g., CSI-RS and the reference signal pattern may be as depicted in FIGS. 3A to 3D and 4. At block 1604, information indicating the time-frequency pattern is transmitted to a user equipment in a unicast message. In some designs, the information may comprise a bitmap, as previously discussed.

FIG. 17 is a block diagram representation of a portion of a wireless communication apparatus 1700. The module 1702 is for establishing a time-frequency pattern comprising at least one data resource element (RE) for transmission of a reference signal. The module 1704 is for transmitting, in a unicast message, information indicating the time-frequency pattern to a user equipment.

FIG. 18 is a flow chart representation of a process 1800 of wireless communication. At block 1802, a time-frequency pattern comprising at least one data resource element (RE) for transmission of a reference signal is established. The reference signal may be, e.g., CSI-RS and the reference signal pattern may be as depicted in FIGS. 3A to 3D and 4. At block 1804, information indicating the time-frequency pattern is transmitted to a user equipment in a broadcast message. In some designs, the information may comprise a bitmap, as previously discussed.

FIG. 19 is a block diagram representation of a portion of a wireless communication apparatus 1900. The module 1902 is for establishing a time-frequency pattern comprising at least one data resource element (RE) for transmission of a reference signal. The module 1904 is for transmitting, in a broadcast message, information indicating the time-frequency pattern to a user equipment.

FIG. 20 is a flow chart representation of a process 2000 of wireless communication. At block 2002, information indicating a time-frequency muting pattern comprising at least one RE for transmission of a reference signal is received in a unicast message. The information may comprises, e.g., a bitmap. The reference signal may be, e.g., CSI-RS. At block 2004, the reference signal is received in at least one RE which was indicated in the received message.

FIG. 21 is a block diagram representation of a portion of a wireless communication apparatus 2100. The module 2102 is for receiving, in a unicast message, information indicating a time-frequency pattern comprising at least one resource element (RE) for transmission of a reference signal. The module 2104 is for receiving the reference signal in the RE indicated in the received message.

FIG. 22 is a flow chart representation of a process 2200 of wireless communication. At block 2202, information indicating a time-frequency muting pattern comprising at least one RE for transmission of a reference signal is received in a broadcast message. The information may comprises, e.g., a bitmap. The reference signal may be, e.g., CSI-RS. At block 2204, the reference signal is received in at least one RE which was indicated in the received message.

FIG. 23 is a block diagram representation of a portion of a wireless communication apparatus 2300. The module 2302 is for receiving, in a broadcast message, information indicating a time-frequency pattern comprising at least one resource element (RE) for transmission of a reference signal. The module 2304 is for receiving the reference signal in the RE indicated in the received message.

Figure 24:
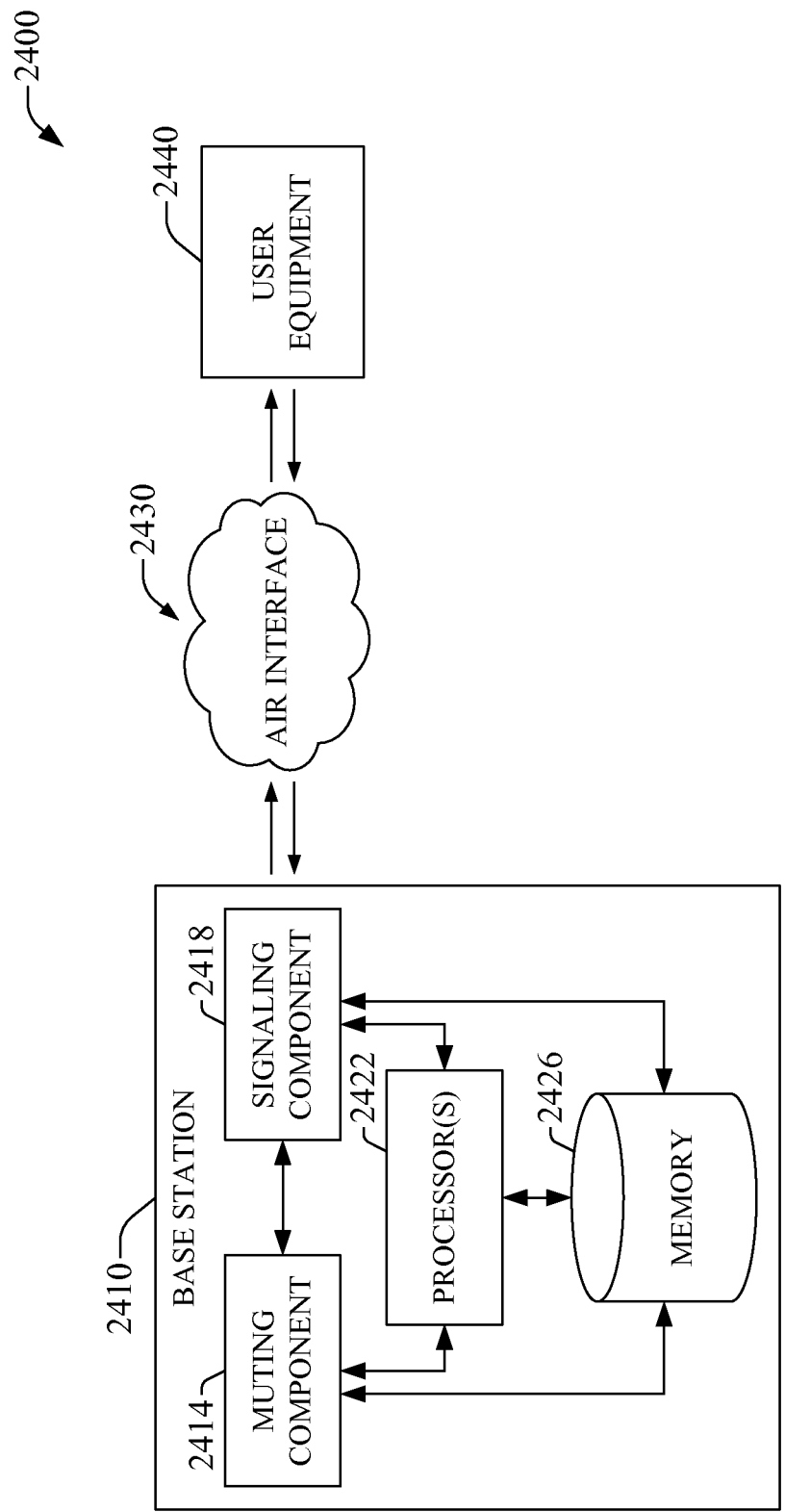
FIG. 24 illustrates a high level block diagram of a system that enables and can exploit muting of CSI-RS and signaling that conveys muting scheme(s) or pattern(s) in accordance with aspects described herein.

FIG. 24 illustrates a high level block diagram of another example system 2400 that enables and can exploit muting resources for channel state information reference signal and signaling that conveys muting scheme(s) or pattern(s) in accordance with aspects described herein. In example system 2400, a base station 2410 (also referred to as a node, evolved node B (eNB), serving eNB, target eNB, femtocell base station, picocell base station) exchange data (e.g., pilot data, traffic data) or signaling with UE 2440 via air interface 2430; user equipment 2440 can be an access terminal (also referred to as terminal, user equipment, or mobile device and may be similar to UE 120 described above). In one or more embodiments, a radio component (not shown) delivers data and/or signaling to UE 2440 through a set of one or more antennas (not shown) and associated circuitry (not shown). Operation of such circuitry can be enabled, at least in part, by processor(s) 2422. At least a portion of the signaling that base station 2410 delivers to UE 2440 conveys information (e.g., payload data) that determines muting of CSI-RS REs, e.g., determines features of a time-frequency muting pattern that determines at least a first set of resources (e.g., REs) to allocate for CSI-RS pilot data transmission and at least a second set of resources (e.g., RE) to not allocate for pilot data transmission or data transmission In scenarios in which UE 2440 is configured to operate in the presence of muting of radio resources, base station 2410 can either rate match around muted tones or puncture the muted tones. In an aspect of the subject disclosure, rate matching is expected to perform better. In such scenarios, UE 2410 can receive signaling from base station 2410 associated with rate matching or puncturing. In additional or alternative scenarios, UEs that are not configured to operate in the presence of muting of radio resources, base station 210 can puncture the data tones.

A time-frequency muting pattern can be one of static, semi-static, or dynamic. In an example of static time-frequency muting pattern, CSI-RS spectral locations of macro base station can be limited, whereas CSI-RS spectral location of low-power base stations (e.g., eNB; femtocell, picocell, Wi-Fi AP) can always or substantially always mute at least a portion (e.g., all) the CSI-RS spectral locations assigned to one or more macro base stations. In an aspect, of the subject innovation, a time-frequency muting pattern can be triggered or effected when (e.g., at a time, or after the time) a UE served by a macro base station comes into the coverage of a low-power base station. In the illustrated embodiment, muting component 2414 can determine the muting pattern to be one of static, semi-static, or dynamic. It should be appreciated that for muted spectral locations, no pilot data transmission(s) or data transmission(s) are allowed.

In addition, base station 2410 can determine the spectral (frequency, time, or time-frequency) locations of CSI-RS resources to transmit pilot data and the spectral locations to mute, e.g., to not transmit any data (pilot data, traffic, etc.), based on at least one of (i) operational features of UE 2440 or other UEs in the coverage area of base station 2410, wherein the operational features include measurement of CSI-RS of weaker cells (e.g., cells served by a base station that transmits at lower power than transmission power of base station 2410); (ii) UE feedback of neighbor cells; (iii) backhaul communications between different base stations, e.g., communication; (iv) eNB listening to its neighborhood, which can be accomplished through a scanner component (not shown), which can be part of signaling component 2418 or the radio component referred to supra. In the illustrated embodiment, muting component 2414 can determine the spectral locations of CSI-RS resources as described supra.

It should be appreciated that base station 2410 can avoid muting all CSI-RS spectral locations of a weaker cell, or weaker base station. Instead, base station 2410 can mute a spectral location partially in time domain or in frequency domain, and the muted spectral location can evolve over time, occupying disparate spectral location as time progresses. As an example, base station 2410, through muting component 2414, can mute a set of one or more CSI-RS REs in specific sub-bands. The time-frequency muting pattern can be the same across a selected set of sub-bands in order to reduce signaling overhead, but it could be different in general. As another example, base station 2410 can mute REs on alternate CSI-RS sub-frames. As yet another example, base station 2410 can mute CSI-RS REs of one cell (e.g., a weaker cell) in one subframe and different cell (a disparate weaker cell) in a subsequent CSI-RS sub-frame, and so forth.

In some designs, as previously discussed, a time-frequency pattern, which can include a CSI-RS resource pattern or muting pattern, can be established based on the power class of base station 2410. For example, in scenarios base station 2410 serves a macro cell, base station 2410 can be allowed, or configured, to utilize a set of one or more CSI-RS resources or spectral locations. Likewise, in scenarios base station 2410 is a picocell or femtocell, base station 2410 can be allowed to utilize a different set of one or more CSI-RS resources of spectral locations. Accordingly, in one or more scenarios, base station that serves a macro cell can avoid muting the CSI-RS spectral locations a femtocell; in an aspect, the femtocell may be required to always mute all possible macro CSI-RS locations.

Various features that characterize a time-frequency pattern that allows muting a set of spectral locations or radio resources can be signaling through signaling component 2418 in accordance with the following aspects of the subject disclosure. The CSI-RS pattern and a muting pattern, the number of CSI-RS ports, the number of muted tones, and the like, can be signaled using RRC signaling; for instance, data that conveys such information can be included in and delivered via broadcast channels, such as system information block (SIB) messages. In addition, such information can be unicast to UE 2440 or any other UE. A bit map can indicate the muting status of each group which gives full flexibility in muting. In an aspect, for eight antennas, the bit map can include 6 bits, corresponding to six realizations of available radio resources for CSI-RS (e.g., see FIG. 3D). Similarly, for groups of four spectral locations, a bit map with 13 bits can identify a time-frequency muting pattern, whereas a 26-bit bitmap can identify various time-frequency muting patterns when spectral locations are accommodated in group of two.

In addition, to reduce signaling overhead, signaling component 2418 can impose a lower bound and an upper bound on the number of muted REs; such lower bound and upper bound being configurable by a network operator or automatically or autonomously determined by signaling component 2418 based on network load conditions. For example, muting can be effected within the interval between at least 4 REs and 16 REs, without muting of spectral location above 16 REs. In addition, combinations of groups that can be simultaneously muted can be limited in other manners; signaling component 2418 also can impose such limitations. In another aspect, the muting of CSI-RS spectral locations or the number of ports interpretation can be different for different cell IDs or power class base station 2410. Moreover, signaling component 2418 also can be deliver information that characterizes or determines how a time-frequency muting pattern changes or evolves with time or in frequency domain. As an example, a bitmap could indicate which sub-bands are muted.

Reduced reuse factor to reduce signaling overhead. In example CSI-RS pattern presented in FIGS. 3A to 3D and 4, an eNB with 4 Tx antennas can utilize 1 of 13 patterns, whereas an eNB with 2 Tx could 1 in 26 patterns. As described supra, in an example, a 13-bit bitmap can identify a selection amongst the 13 patterns, while a 26-bit map can identify a selection amongst the 26 patterns. In the alternative, base station 2410 can limit the number of CSI-RS patterns for eNBs with fewer antennas; for example, for 4 Tx antennas in a base station (e.g., 210), muting component 2414 can limit muting of spectral locations to only the ones without the underscore indices in FIG. 3A to 3D. Such limitation can reduce the reuse factor for CSI-RS for 4 Tx, but if reuse factor of 6 is sufficient, this allows reducing the signaling overhead with muting.

Figure 25:
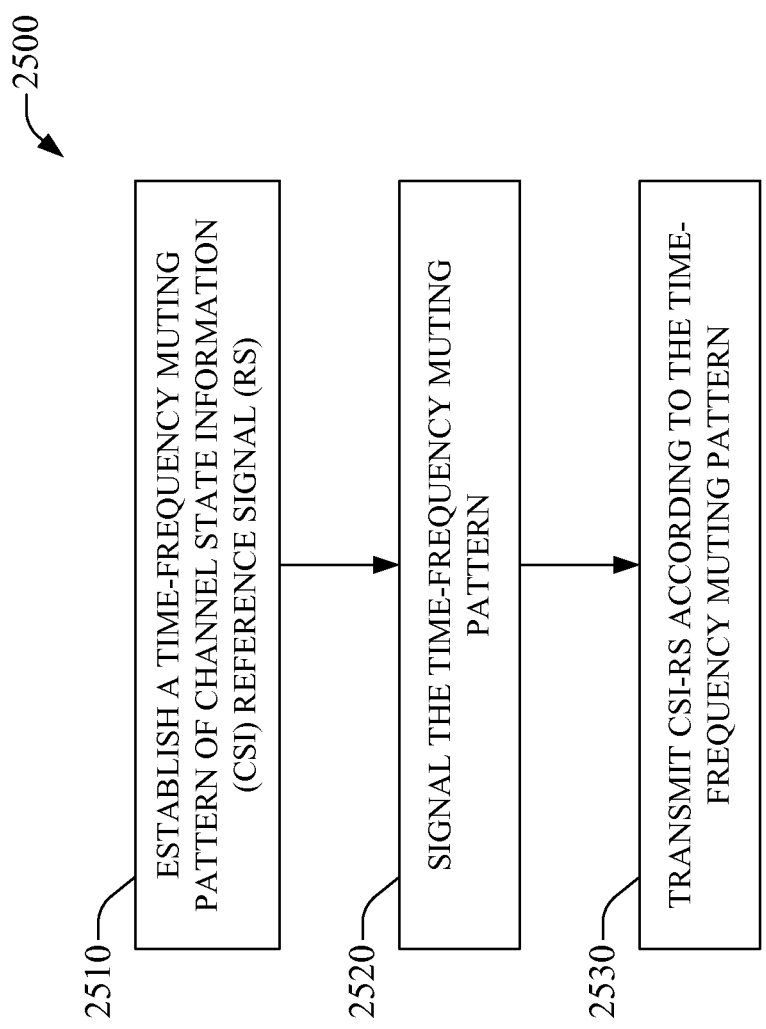
FIG. 25 is a flow chart of a method for updating a mapping (i) a radio bearer for interface between a relay node and user equipment and (ii) a data radio bearer for interface between a relay node and a donor base station according to aspects described herein.

Based at least on example system(s) described supra, another example method that can be implemented in accordance with the disclosed subject matter can be better appreciated with reference to FIG. 25, which presents a flow chart of an example method 2500 for muting resources for CSI-RS according to aspects of the subject disclosure. While, for purposes of simplicity of explanation, the methodology (e.g., the set of one or more example methods) described herein is shown and described as a series of acts, it is to be understood and appreciated that the methodology is not limited by the order of acts, as some acts may, in accordance with one or more aspects, occur in different orders and/or concurrently with other acts from that shown and described herein. For example, it will be understood and appreciated that one or more example methods within the methodology set forth in the subject disclosure can alternatively be represented as a series of interrelated states or events, such as in a state diagram or in a call flow. Moreover, not all illustrated acts may be utilized to implement a method that is part of the methodology described herein in accordance with the various aspects of the subject disclosure. Various methods with the disclosed methodology can be combined in several manners to accomplish one or more advantages that can be achieved through implementation of the subject disclosure.

At block 2510, a time-frequency muting pattern of channel state information (CSI) reference signal (RS) is established. As described supra, the time-frequency muting pattern determines at least a first set of resources (e.g., REs) to allocate for CSI-RS pilot data transmission and at least a second set of resources (e.g., REs) to not allocate for pilot data transmission or data transmission. In an aspect, establishing the time-frequency muting pattern includes determining a time-frequency muting pattern of CSI-RS for at least one carrier in a multi-carrier system. In another aspect, establishing the time-frequency muting pattern includes ascertaining the power class of a base station that exploits the time-frequency muting pattern, and selecting the first set of CSI-RS resources and the second set of CSI-RS resources based at least on the power class of the base station. At block 2520, the time-frequency muting pattern is signaled. The signaling can include various bitmap(s) that convey spectral structure of a muting pattern; such structure can depend at least in part on number of transmit antennas of the base station that effects the muting. In an aspect, signaling the time-frequency muting pattern includes delivering an indication of the time-frequency muting pattern in at least one of a broadcast message or a unicast message. In another aspect, signaling the time-frequency muting pattern includes delivering a bit map that identifies the first set of resources and the second set of resources. At block 2530, CSI-RS is transmitted according to the time-frequency muting pattern.

Figure 26:
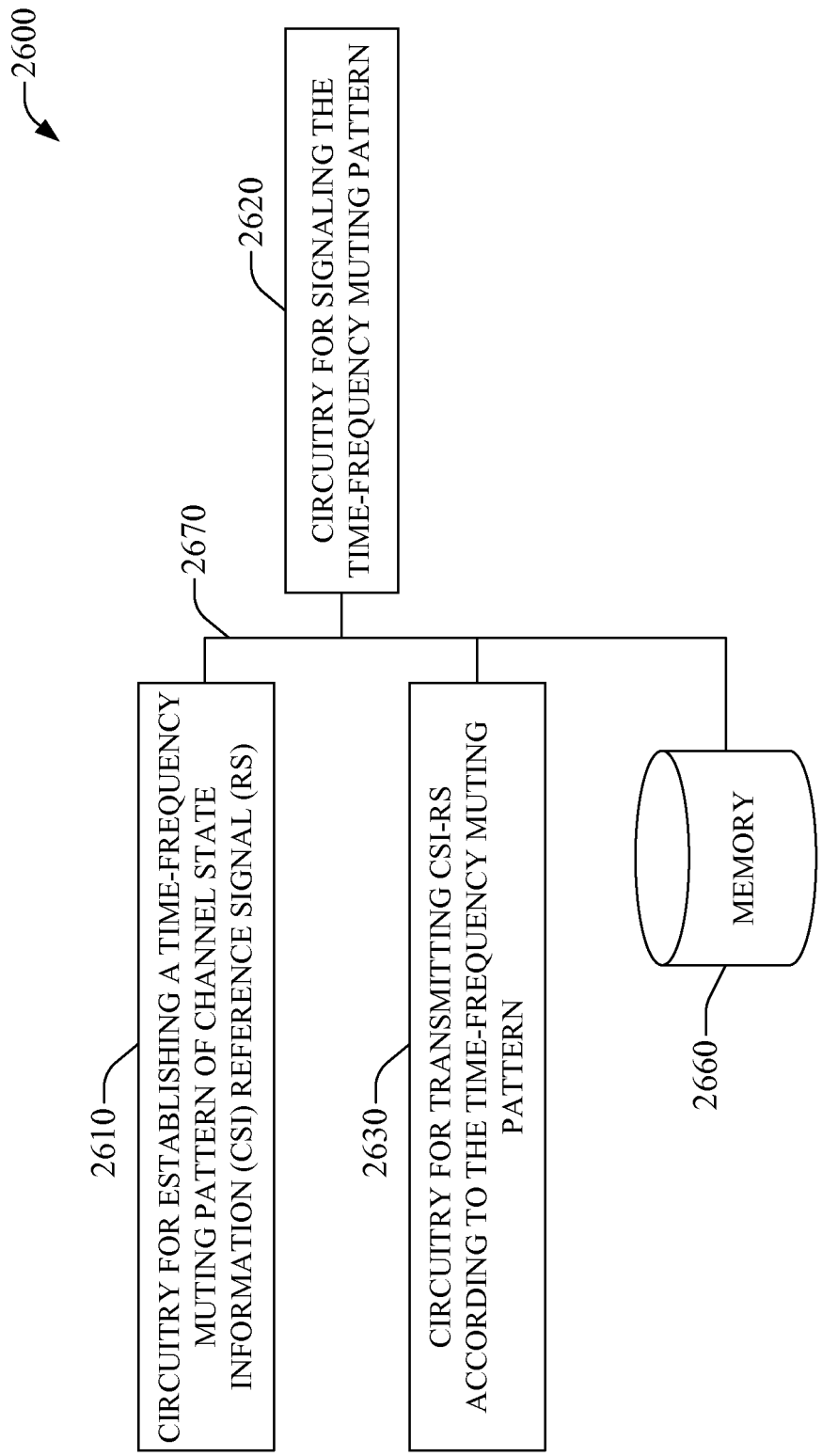
FIG. 26 illustrates a block diagram of a system that enables and exploits various aspects of the subject disclosure.

FIG. 26 is a block diagram of an example system 2600 that enables and exploits various aspects of the subject disclosure in connection with muting resources for CSI-RS and delivering signaling that convey muting scheme(s) or pattern(s). The example system 2600 includes electronic circuitry (also referred to as circuitry) 2610 for establishing a time-frequency muting pattern of CSI-RS. In addition, example system 2600 includes circuitry 2620 for signaling the time-frequency muting pattern. Moreover, example system 2600 includes circuitry for transmitting CSI-RS according to the time-frequency muting pattern. The example system 2600 also includes a memory 2660 that can store one or more sets of code instructions that, when executed by at least one processor, which can be part of the described circuitry, implement or enable the various aspects or features described herein in connection with radio bearer mapping described herein. In an aspect, memory 2660 includes data that defines one or more groups of resource elements that are assigned to CSI-RS and can be utilized to establish at least one time-frequency muting pattern; bit maps that identify a time-frequency muting pattern. In another aspect, memory 2660 can include various code instructions that can be executed by at least one processor to enable, at least in part, functionality of the various circuitry in example system 2600 in accordance with aspects of the subject disclosure. The at least one processor can be distributed amongst the circuitry that is part of the subject example system 2600.

Interface 2670 enables exchange of data (e.g., code instructions, parameters . . . ) amongst the various circuitry blocks of example system 2600. To at least such end, the interface 2670 can include various architectures such as memory bus(es), address bus(es), message bus(es), wired and wireless links, or the like.

In summary, various techniques for muting REs are disclosed. In one aspect, a set of REs available for data transmissions are muted to mitigate interference with reference signal transmissions in neighboring cells. In some designs, the muted REs are established in a muting pattern and the muting pattern is transmitted to a user equipment.

It will be appreciated that, in some designs, the muting pattern is specified using a muting group, thereby advantageously reducing the number of bits required to describe the muting pattern. In some designs, the muting group corresponds to the pattern allocable to a reference signal transmission. As a specific example, a 4-port (4 Tx) transmission group for CSI-RS may be used as a muting group.

It will also be appreciated that the use of data puncturing and data rate matching to facilitate reception of data by UEs 120 is disclosed. For UEs 120 that are not aware of the muting operation, and are therefore expecting data transmissions at muted REs, data transmissions may be punctured around the muted REs. For UEs 120 that are aware of the muting operation, data transmissions may be performed by rate matching or by puncturing around the muted locations.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., transmitters, receivers, assigners, establishers, data rate matchers, data puncturers, calculators, information receivers, data receivers, and so on), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of wireless communication, comprising:
    establishing a time-frequency muting pattern including at least one data resource element (RE), wherein the establishing includes grouping a plurality of REs into muting groups such that the time-frequency muting pattern includes the muting groups, and wherein each muting group includes REs that correspond to a reference signal pattern; and
    transmitting information indicating the time-frequency muting pattern to a user equipment, wherein the transmitting the information includes transmitting a bitmap that identifies the time-frequency muting pattern, wherein at least one bit in the bitmap corresponds to one of the muting groups.

2. The method of claim 1, wherein the bitmap includes a number of bits equal to a number of muting groups and wherein each bit in the bitmap corresponds to a muting group.

3. The method of claim 1, wherein the reference signal pattern includes a channel state information reference signal (CSI-RS) pattern.

4. The method of claim 3, wherein the muting groups form a subset of all possible CSI-RS antenna patterns.

5. The method of claim 1, wherein the muting groups correspond to a set of CSI-RS patterns for a fixed number of antenna ports.

6. The method of claim 5, wherein the fixed number of antenna ports is four.

7. The method of claim 1, further including transmitting the reference signal pattern to the user equipment.

8. The method of claim 1, wherein the establishing includes establishing the time-frequency muting pattern based on a power class of a transmitter of a reference signal.

9. The method of claim 1, wherein the transmitting the information includes transmitting an indication of the time-frequency muting pattern in a broadcast message.

10. The method of claim 1, wherein the transmitting the information includes transmitting an indication of the time-frequency muting pattern in a unicast message.

11. The method of claim 1, further including transmitting a signal by rate matching around the at least one data RE in the time-frequency muting pattern.

12. The method of claim 1, further including transmitting a signal by puncturing at least one resource element in the time-frequency muting pattern.

13. The method of claim 1, wherein the transmitting the information includes transmitting information indicating how the time-frequency muting pattern changes across subframes.

14. The method of claim 1, wherein at least some transmission resources from the time-frequency muting pattern coincide with transmission resources allocated to transmission of a reference signal in a neighboring cell.

15. An apparatus for wireless communication, comprising:
    means for establishing a time-frequency muting pattern including at least one data resource element (RE), wherein the means for establishing includes means for grouping a plurality of REs into muting groups such that the time-frequency muting pattern includes the muting groups, and wherein each muting group includes REs that correspond to a reference signal pattern; and
    means for transmitting information indicating the time-frequency muting pattern to a user equipment, wherein the means for transmitting the information includes means for transmitting a bitmap that identifies the time-frequency muting pattern, wherein at least one bit in the bitmap corresponds to one of the muting groups.

16. The apparatus of claim 15, wherein the bitmap includes a number of bits equal to a number of muting groups and wherein each bit in the bitmap corresponds to a muting group.

17. The apparatus of claim 15, wherein the reference signal pattern includes a channel state information reference signal (CSI-RS) pattern.

18. The apparatus of claim 17, wherein the muting groups form a subset of all possible CSI-RS antenna patterns.

19. The apparatus of claim 18, wherein the muting groups correspond to a set of CSI-RS patterns for a fixed number of antenna ports.

20. The apparatus of claim 19, wherein the fixed number of antenna ports is four.

21. The apparatus of claim 15, further including means for transmitting the reference signal pattern to the user equipment.

22. The apparatus of claim 15, wherein the means for establishing includes means for establishing the time-frequency muting pattern based on a power class of a transmitter of a reference signal.

23. The apparatus of claim 15, wherein the means for transmitting the information includes means for transmitting an indication of the time-frequency muting pattern in a broadcast message.

24. The apparatus of claim 15, wherein the means for transmitting the information includes means for transmitting an indication of the time-frequency muting pattern in a unicast message.

25. The apparatus of claim 15, further including means for transmitting a signal by rate matching around the at least one data RE in the time-frequency muting pattern.

26. The apparatus of claim 15, further including means for transmitting a signal by puncturing at least one resource element in the time-frequency muting pattern.

27. The apparatus of claim 15, wherein the means for transmitting the information includes means for transmitting information indicating how the time-frequency muting pattern changes across subframes.

28. The apparatus of claim 15, wherein at least some transmission resources from the time-frequency muting pattern coincide with transmission resources allocated to transmission of a reference signal in a neighboring cell.

29. An apparatus for wireless communication, comprising:
at least one processor configured to:
establish a time-frequency muting pattern including at least one data resource element (RE), wherein the at least one processor is further configured to group a plurality of REs into muting groups such that the time-frequency muting pattern includes the muting groups, and wherein each muting group includes REs that correspond to a reference signal pattern; and
transmit the time-frequency muting pattern to a user equipment, wherein the at least one processor is further configured to transmit a bitmap that identifies the time-frequency muting pattern, wherein at least one bit in the bitmap corresponds to one of the muting groups.

30. The apparatus of claim 29, wherein the at least one processor is further configured to perform one of:
transmit a signal by rate matching around at least one resource element in the time-frequency muting pattern; and
transmit a signal by puncturing at least one resource element in the time-frequency muting pattern.

31. The apparatus of claim 29, wherein the bitmap includes a number of bits equal to a number of muting groups and wherein each bit in the bitmap corresponds to a muting group.

32. The apparatus of claim 29, wherein the reference signal pattern includes a channel state information reference signal (CSI-RS) pattern.

33. The apparatus of claim 29, the at least one processor is further configured to
transmit a signal by rate matching around the at least one data RE in the time-frequency muting pattern.

34. The apparatus of claim 29, wherein at least some transmission resources from the time-frequency muting pattern coincide with transmission resources allocated to transmission of a reference signal in a neighboring cell.

35. A non-transitory computer-readable medium storing computer-executable code, comprising:
code for causing a computer to establish a time-frequency muting pattern including at least one data resource element (RE), wherein the code for causing the computer to establish includes code for causing the computer to group a plurality of REs into muting groups such that the time-frequency muting pattern includes the muting groups, and wherein each muting group includes REs that correspond to a reference signal pattern; and
code for causing the computer to transmit information indicating the time-frequency muting pattern to a user equipment, wherein the code for causing the computer to transmit includes code for causing the computer to transmit a bitmap that identifies the time-frequency muting pattern, wherein at least one bit in the bitmap corresponds to one of the muting groups.

36. The non-transitory computer-readable medium of claim 35, wherein the bitmap includes a number of bits equal to a number of muting groups and wherein each bit in the bitmap corresponds to a muting group.

37. The non-transitory computer-readable medium of claim 35, wherein the reference signal pattern includes a channel state information reference signal (CSI-RS) pattern.

38. The non-transitory computer-readable medium of claim 35, further including code for causing the computer to transmit a signal by rate matching around the at least one data RE in the time-frequency muting pattern.

39. The non-transitory computer-readable medium of claim 35, wherein at least some transmission resources from the time-frequency muting pattern coincide with transmission resources allocated to transmission of a reference signal in a neighboring cell.

40. A method of wireless communication, comprising:
determining whether a first user equipment and a second user equipment are aware of a reference signal transmission and a muting operation on data resources;
transmitting data to the first user equipment that is aware of the reference signal transmission and the muting operation on the data resources by performing one of a rate matching and a puncturing operation around resources allocated to the reference signal transmission and the muting operation; and
transmitting data to the second user equipment that is not aware of the reference signal transmission and the muting operation, by puncturing data transmission on resources allocated to the reference signal transmission and the muting operation.

41. The method of claim 40, wherein the reference signal includes channel state information reference signal (CSI-RS).

42. A wireless communication apparatus, comprising:
means for determining whether a first user equipment and a second user equipment are aware of a reference signal transmission and a muting operation on data resources;
means for transmitting data to the first user equipment that is aware of the reference signal transmission and the muting operation on the data resources by performing one of a rate matching and a puncturing operation around resources allocated to the reference signal transmission and the muting operation; and
means for transmitting data to the second user equipment that is not aware of the reference signal transmission and the muting operation, by puncturing data transmission on resources allocated to the reference signal transmission and the muting operation.

43. The apparatus of claim 42, wherein the reference signal includes channel state information reference signal (CSI-RS).

44. A non-transitory computer-readable medium storing computer-executable code, comprising:

code for causing a computer to determine whether a first user equipment and a second user equipment are aware of a reference signal transmission and a muting operation on data resources;

code for causing the computer to transmit data to the first user equipment that is aware of the reference signal transmission and the muting operation on the data resources by performing one of a rate matching and a puncturing operation around resources allocated to the reference signal transmission and the muting operation; and code for causing the computer to transmit data to the second user equipment that is not aware of the reference signal transmission and the muting operation, by puncturing data transmission on resources allocated to the reference signal transmission and the muting operation.

45. An apparatus for wireless communication, comprising:

at least one processor configured to:
  determine whether a first user equipment and a second user equipment are aware of a reference signal transmission and a muting operation on data resources;
  transmit data to the first user equipment that is aware of the reference signal transmission and the muting operation on the data resources by performing one of a rate matching and a puncturing operation around resources allocated to the reference signal transmission and the muting operation; and
  transmit data to the second user equipment that is not aware of the reference signal transmission and the muting operation, by puncturing data transmission on resources allocated to the reference signal transmission and the muting operation; and
memory coupled to the at least one processor.

46. The apparatus of claim 45, wherein the reference signal includes channel state information reference signal (CSI-RS).

47. A wireless communication method, comprising:
assigning a code profile to a user equipment; and
transmitting, to the user equipment, a resource muting pattern based on the assigned code profile, wherein the code profile is indicative of a likelihood of a transmission coding scheme used for data transmission to the user equipment.

48. The method of claim 47, wherein the transmission coding scheme includes space frequency block coding (SFBC).

49. A wireless communication apparatus, comprising:
means for assigning a code profile to a user equipment; and
means for transmitting, to the user equipment, a resource muting pattern based on the assigned code profile, wherein the code profile is indicative of a likelihood of a transmission coding scheme used for data transmission to the user equipment.

50. The apparatus of claim 49, wherein the transmission coding scheme includes space frequency block coding (SFBC).

51. A non-transitory computer-readable medium storing computer-executable code, comprising:
code for causing a computer to assign a code profile to a user equipment; and
code for causing the computer to transmit, to the user equipment, a resource muting pattern based on the assigned code profile, wherein the code profile is indicative of a likelihood of a transmission coding scheme used for data transmission to the user equipment.

52. An apparatus for wireless communication, comprising:
at least one processor configured to:
  assign a code profile to a user equipment; and
  transmit, to the user equipment, a resource muting pattern based on the assigned code profile, wherein the code profile is indicative of a likelihood of a transmission coding scheme used for data transmission to the user equipment; and
memory coupled to the at least one processor.

53. The apparatus of claim 52, wherein the code profile is indicative of a likelihood of a space frequency block coding (SFBC) scheme used for data transmission to the user equipment.

54. A method of wireless communications, comprising:
receiving information related to a time-frequency muting pattern including at least one data resource element (RE), wherein the information related to the time-frequency muting pattern includes muting groups, and wherein each muting group includes REs that correspond to a reference signal pattern; and
receiving at least one data transmission using a transmission resource not included in the time-frequency muting pattern.

55. The method of claim 54, wherein the receiving the information further includes receiving a bitmap that identifies the time-frequency muting pattern.

56. The method of claim 55, wherein the bitmap includes a number of bits equal to a number of muting groups and wherein each bit in the bitmap corresponds to a muting group.

57. The method of claim 54, wherein the reference signal pattern includes a channel state information reference signal (CSI-RS) pattern.

58. The method of claim 57, wherein the muting groups form a subset of all possible CSI-RS antenna patterns.

59. The method of claim 58, wherein the muting groups correspond to a set of CSI-RS patterns for a fixed number of antenna ports.

60. The method of claim 59, wherein the fixed number of antenna ports is four.

61. The method of claim 54, further including receiving the reference signal pattern.

62. The method of claim 54, wherein the receiving the information includes receiving the information related to the time-frequency muting pattern responsive to a power class of a transmitter of a reference signal.

63. The method of claim 54, wherein the receiving the information includes receiving the information in a broadcast message.

64. The method of claim 54, wherein the receiving the information includes receiving the information in a unicast message.

65. The method of claim 54, wherein the receiving the information includes receiving a bitmap that identifies the time-frequency muting pattern.

66. The method of claim 65, wherein at least one bit in the bitmap corresponds to one of the muting groups.

67. The method of claim 54, wherein the receiving the data transmission includes receiving a data transmission rate matched around at least one resource element in the time-frequency muting pattern.

68. The method of claim 54, further including receiving a signal punctured at REs in the time-frequency muting pattern.

69. The method of claim 54, wherein the receiving the information includes receiving information indicating how the time-frequency muting pattern changes across subframes.

70. A wireless communications apparatus, comprising:
means for receiving information related to a time-frequency muting pattern including at least one data resource element (RE), wherein the information related to the time-frequency muting pattern includes muting groups, and wherein each muting group includes REs that correspond to a reference signal pattern; and
means for receiving at least one data transmission using a transmission resource not included in the time-frequency muting pattern.

71. The apparatus of claim 70, wherein the means for receiving the information further includes means for receiving a bitmap that identifies the time-frequency muting pattern.

72. The apparatus of claim 71, wherein the bitmap includes a number of bits equal to a number of muting groups and wherein each bit in the bitmap corresponds to a muting group.

73. The apparatus of claim 70, wherein the reference signal pattern includes a channel state information reference signal (CSI-RS) pattern.

74. The apparatus of claim 73, wherein the muting groups form a subset of all possible CSI-RS antenna patterns.

75. The apparatus of claim 74, wherein the muting groups correspond to a set of CSI-RS patterns for a fixed number of antenna ports.

76. The apparatus of claim 75, wherein the fixed number of antenna ports is four.

77. The apparatus of claim 70, further including means for receiving a reference signal pattern.

78. The apparatus of claim 70, wherein the means for receiving the information includes means for receiving the information related to the time-frequency muting pattern responsive to a power class of a transmitter of a reference signal.

79. The apparatus of claim 70, wherein the means for receiving the information includes means for receiving the information in a broadcast message.

80. The apparatus of claim 70, wherein the means for receiving the information includes means for receiving the information in a unicast message.

81. The apparatus of claim 70, wherein the means for receiving the information includes means for receiving a bitmap that identifies the time-frequency muting pattern.

82. The apparatus of claim 81, wherein at least one bit in the bitmap corresponds to one of the muting groups.

83. The apparatus of claim 70, wherein the means for receiving the data transmission includes means for receiving the data transmission rate matched around at least one resource element in the time-frequency muting pattern.

84. The apparatus of claim 70, further including means for receiving a signal punctured at REs in the time-frequency muting pattern.

85. The apparatus of claim 70, wherein the means for receiving the information includes means for receiving information indicating how the time-frequency muting pattern changes across subframes.

86. A non-transitory computer-readable medium storing computer-executable code, comprising:
code for causing a computer to receive information related to a time-frequency muting pattern including at least one data resource element (RE), wherein the information related to the time-frequency muting pattern includes muting groups, and wherein each muting group includes REs that correspond to a reference signal pattern; and
code for causing a computer to receive at least one data transmission using a transmission resource not included in the time-frequency muting pattern.

87. The non-transitory computer-readable medium of claim 86, wherein the code for causing the computer to receive a data transmission includes code for causing the computer to receive the data transmission rate matched around at least one resource element in the time-frequency muting pattern.

88. The non-transitory computer-readable medium of claim 86, further including code for causing the computer to receive a signal punctured at REs in the time-frequency muting pattern.

89. An apparatus for wireless communication, comprising:
at least one processor configured to:
receive information related to a time-frequency muting pattern including at least one data resource element (RE), wherein the information related to the time-frequency muting pattern includes muting groups, and wherein each muting group includes REs that correspond to a reference signal pattern; and
receive at least one data transmission using a transmission resource not included in the time-frequency muting pattern; and
memory coupled to the at least one processor.

90. The apparatus of claim 89, wherein the at least one processor is configured to receive the at least one data transmission rate matched around at least one resource element in the time-frequency muting pattern.

91. The apparatus of claim 89, wherein the at least one processor is further configured to receive a signal punctured at REs in the time-frequency muting pattern.

92. A method of wireless communication, comprising:
receiving muting information related to a reference signal in a subframe; and
calculating a transport block size received in the subframe using a scale factor based on the received muting information.

93. A wireless communication apparatus, comprising:
means for receiving muting information related to a reference signal in a subframe; and
means for calculating a transport block size received in the subframe using a scale factor based on the received muting information.

94. A non-transitory computer-readable medium storing computer-executable code, comprising:
code for causing a computer to receive muting information related to a reference signal in a subframe; and
code for causing the computer to calculate a transport block size received in the subframe using a scale factor based on the received muting information.

95. An apparatus for wireless communication, comprising:
at least one processor configured to:
receive muting information related to a reference signal in a subframe; and
calculate a transport block size received in the subframe using a scale factor based on the received muting information; and
memory coupled to the at least one processor.

* * * * *